United States Patent
Harada et al.

(10) Patent No.: US 9,492,777 B2
(45) Date of Patent: Nov. 15, 2016

(54) HYDROGEN GENERATION DEVICE, OPERATION METHOD THEREOF, AND FUEL CELL SYSTEM

(75) Inventors: Chie Harada, Osaka (JP); Hidenobu Wakita, Kyoto (JP);
(Continued)

(73) Assignee: PANASONIC INTELLECTUAL PROPERTY MANAGEMENT CO., LTD., OSAKA (JP)

(*) Notice: Subject to any disclaimer, the term of this patent is extended or adjusted under 35 U.S.C. 154(b) by 245 days.

(21) Appl. No.: 14/118,185

(22) PCT Filed: May 25, 2012

(86) PCT No.: PCT/JP2012/003439
§ 371 (c)(1),
(2), (4) Date: Nov. 15, 2013

(87) PCT Pub. No.: WO2012/164897
PCT Pub. Date: Dec. 6, 2012

(65) Prior Publication Data
US 2014/0072888 A1    Mar. 13, 2014

(30) Foreign Application Priority Data
May 27, 2011 (JP) .................. 2011-119060

(51) Int. Cl.
| H01M 8/04 | (2016.01) |
| B01D 53/04 | (2006.01) |
| H01M 8/06 | (2016.01) |
| C01B 3/38 | (2006.01) |

(52) U.S. Cl.
CPC ............ B01D 53/04 (2013.01); C01B 3/38 (2013.01); H01M 8/04223 (2013.01);
(Continued)

(58) Field of Classification Search
None
See application file for complete search history.

(56) References Cited

U.S. PATENT DOCUMENTS

| 5,302,470 A | 4/1994 | Okada et al. |
| 5,686,196 A | 11/1997 | Singh et al. |

(Continued)

FOREIGN PATENT DOCUMENTS

| EP | 2518013 A1 | 10/2012 |
| JP | 01-275697 A | 11/1989 |

(Continued)

OTHER PUBLICATIONS

Saimiya—JP 2009249203 (Machine translation)—2009.*
(Continued)

*Primary Examiner* — Jonathan G Leong
*Assistant Examiner* — Haroon S Sheikh
(74) *Attorney, Agent, or Firm* — McDermott Will & Emery LLP

(57) ABSTRACT

A hydrogen generation device of the present invention comprises a first path (31) used to supply a raw material to a reformer (1) through at least a first desulfurization unit (2); a second path (32) used to supply the raw material to the reformer (1) through only the second desulfurization unit (3); a switch unit (6); a flow control unit (8) which selectively enables or inhibits a flow of the hydrogen-containing gas generated in the reformer 1 toward the second desulfurization unit (3); and a controller (12) configured to execute processing in such a manner that in at least either a time point before generation of the hydrogen-containing gas is stopped, or start-up, the switch unit 6 performs switching to select the first path (31), and the flow control unit (8) enables the flow of the hydrogen-containing gas, while the reformer 1 is generating the hydrogen-containing gas.

15 Claims, 12 Drawing Sheets

(75) Inventors: Seiji Fujihara, Osaka (JP); Tomoyuki Nakajima, Hyogo (JP); Kunihiro Ukai, Nara (JP)

(52) U.S. Cl.
CPC ..... *H01M 8/04373* (2013.01); *H01M 8/04753* (2013.01); *H01M 8/0612* (2013.01); *H01M 8/0668* (2013.01); *H01M 8/0675* (2013.01); *C01B 2203/025* (2013.01); *C01B 2203/0233* (2013.01); *C01B 2203/0244* (2013.01); *C01B 2203/044* (2013.01); *C01B 2203/047* (2013.01); *C01B 2203/0445* (2013.01); *C01B 2203/066* (2013.01); *C01B 2203/127* (2013.01); *C01B 2203/1235* (2013.01); *C01B 2203/1258* (2013.01); *C01B 2203/148* (2013.01); *C01B 2203/1604* (2013.01); *C01B 2203/1609* (2013.01); *Y02E 60/50* (2013.01)

(56) References Cited

U.S. PATENT DOCUMENTS

| | | | | |
|---|---|---|---|---|
| 2005/0106428 A1* | 5/2005 | Bolden | ............... | C01B 3/384 48/197 R |
| 2011/0195322 A1* | 8/2011 | Ukai | ............... | C01B 3/384 429/410 |
| 2012/0040256 A1* | 2/2012 | Kani | ............... | C01B 3/384 429/410 |
| 2012/0178006 A1 | 7/2012 | Kani et al. | | |

FOREIGN PATENT DOCUMENTS

| | | | |
|---|---|---|---|
| JP | 2004-228016 A | 8/2004 | |
| JP | 2006-008459 A | 1/2006 | |
| JP | 4264791 B2 | 5/2009 | |
| JP | 2009-249203 A | 10/2009 | |
| JP | WO2010041471 a1 * | 4/2010 | ............ C01B 3/384 |
| WO | 2009-061072 A1 | 5/2009 | |

OTHER PUBLICATIONS

International Search Report issued in International Application No. PCT/JP2012/003439 dated Aug. 28, 2012, 1 page.

Extended European search report issued in corresponding European Application No. 12792697.0, dated Sep. 29, 2014.

* cited by examiner

HYDROGEN GENERATION DEVICE, OPERATION METHOD THEREOF, AND FUEL CELL SYSTEM

RELATED APPLICATIONS

This application is the U.S. National Phase under 35 U.S.C. §371 of International Application No. PCT/JP2012/003439, filed on May 25, 2012, which in turn claims the benefit of Japanese Application No. 2011-119060, filed on May 27, 2011, the disclosures of which are incorporated by reference herein.

TECHNICAL FIELD

The present invention relates to a hydrogen generation device, an operation method thereof, and a fuel cell system. Particularly, the present invention relates to a hydrogen generation device, an operation method thereof, and a fuel cell system, which include a desulfurization unit for desulfurizing a raw material.

BACKGROUND ART

A hydrogen generation device is used to supply, for example, a hydrogen-containing gas as a fuel gas to a fuel cell. The hydrogen generation device typically includes a reformer for generating the hydrogen-containing gas through a reforming reaction of a raw material and water. As the raw material, a city gas or the like is used. The city gas or the like contains a sulfur compound as an odorous component, etc. Because the sulfur compound is a poisoning substance to a reforming catalyst used in the reforming reaction, it is necessary to remove the sulfur compound in some way or other.

Under the circumstances, there has been proposed a hydrogen generation device which employs a method of removing the sulfur compound by normal-temperature adsorption (hereinafter will be referred to as normal-temperature adsorption/desulfurization, for example, see Patent Literature 1) or a method of removing the sulfur compound by hydrodesulfurization using hydrogen (e.g., see Patent Literature 2). The normal-temperature adsorption/desulfurization is easily handled because of no need for heating and hydrogen, but does not have a great adsorption capacity. On the other hand, the hydrodesulfurization is not easily handled because of a need for heating and hydrogen, but has a great adsorption capacity. Accordingly, there has been proposed a hydrogen generation device which employs the normal-temperature adsorption/desulfurization at start-up and then employs the hydrodesulfurization after generation of the hydrogen-containing gas is enabled (e.g., see Patent Literature 2).

CITATION LIST

Patent Literature

Patent Literature 1: Japanese Laid-Open Patent Application Publication No. 2004-228016
Patent Literature 2: Japanese Laid-Open Patent Application Publication No. Hei. 1-275697

SUMMARY OF INVENTION

Technical Problem

However, for the hydrogen generation device disclosed in Patent Literature 2, a problem caused by the fact that the sulfur compound which is not converted into hydrogen sulfide is adsorbed onto a hydrodesulfurization catalyst was not specifically studied.

The present invention has been made to solve the above mentioned problem, and an object of the present invention is to provide a hydrogen generation device, an operation method thereof, and a fuel cell system, which can reduce a possibility that a problem occurs due to the fact that the sulfur compound which is not converted into hydrogen sulfide is adsorbed onto the hydrodesulfurization catalyst, as compared to a conventional example.

Solution to Problem

According to an aspect of the present invention, a hydrogen generation device comprises a reformer for generating a hydrogen-containing gas using a raw material; a first desulfurization unit for adsorbing and desulfurizing a sulfur compound from the raw material supplied to the reformer; a second desulfurization unit for hydrodesulfurizing the sulfur compound from the raw material supplied to the reformer; a first path used to supply the raw material to the reformer through at least the first desulfurization unit; a second path used to supply the raw material to the reformer through only the second desulfurization unit of the first desulfurization unit and the second desulfurization unit; a switch unit for performing switching between the first path and the second path; a third path used to supply the hydrogen-containing gas generated in the reformer to the second desulfurization unit; a flow control unit which selectively enables or inhibits a flow of the hydrogen-containing gas from an upstream end of the third path toward a downstream end of the third path; and a controller configured to execute processing in such a manner that in at least either a time point before generation of the hydrogen-containing gas is stopped, or start-up, the switch unit performs switching to select the first path, and the flow control unit enables the flow of the hydrogen-containing gas, while the reformer is generating the hydrogen-containing gas.

According to an aspect of the present invention, a fuel cell system comprises the above stated hydrogen generation device; and a fuel cell for generating electric power using the hydrogen-containing gas supplied from the hydrogen generation device.

According to an aspect of the present invention, there is provided a method of operating a hydrogen generation device for generating a hydrogen-containing gas, comprising the steps of: supplying a raw material which has passed through a first desulfurization unit for removing a sulfur compound from the raw material, to the reformer; and supplying the hydrogen-containing gas generated in the reformer to a second desulfurization unit for hydrodesulfurizing the sulfur compound in the raw material, wherein both of the steps are executed in at least either a time point before generation of the hydrogen-containing gas is stopped, or start up.

Advantageous Effects of Invention

According to an aspect of the present invention, it becomes possible to provide a hydrogen generation device, an operation method thereof and a fuel cell system, which can reduce a possibility that a problem occurs due to the fact that a sulfur compound which is not converted into hydrogen sulfide is adsorbed onto a hydrodesulfurization catalyst, as compared to a conventional example.

DESCRIPTION OF EMBODIMENTS

Figure 1:
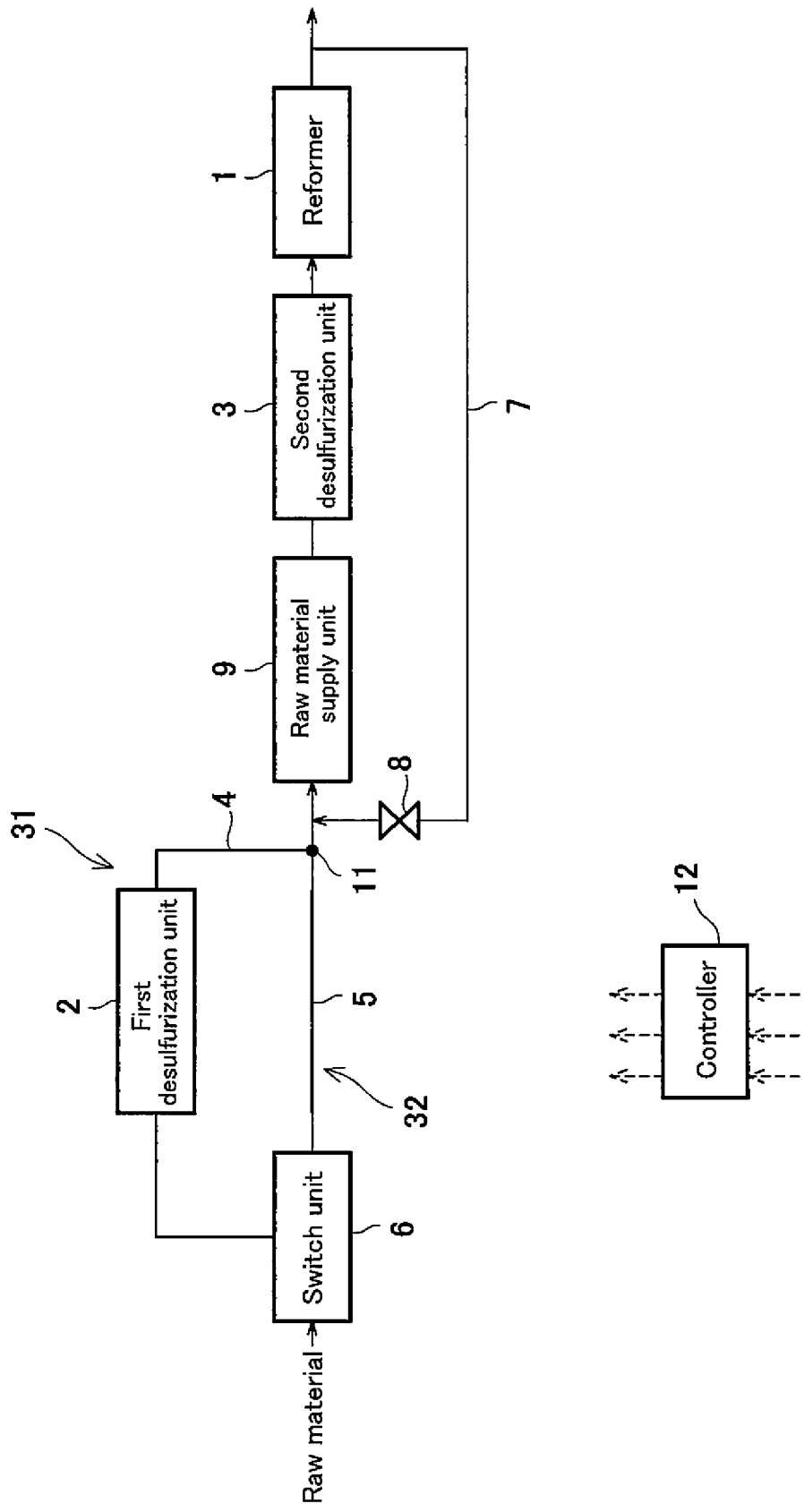
FIG. 1 is a block diagram showing an exemplary configuration of a hydrogen generation device according to Embodiment 1.

In the course of study of the conventional hydrodesulfurization unit in the hydrogen generation device, the present inventors found out that a problem occurs due to the fact that the sulfur compound which is not converted into hydrogen sulfide is adsorbed onto a hydrodesulfurization catalyst as described below.

In a case where the hydrodesulfurization catalyst is configured such that a CoMo-based catalyst and a ZnO catalyst are placed in this order in a flow of the raw material, an unhydrogenated sulfur compound, which is desorbed from the CoMo-based catalyst, is not adsorbed onto the ZnO catalyst and flows into a reforming catalyst. Because of this, the reforming catalyst degrades.

In a case where the hydrodesulfurization catalyst is configured such that the CoMo-based catalyst and a CuZnO catalyst are placed in this order in a flow of the raw material, an unhydrogenated sulfur compound, which is desorbed from the CoMo-based catalyst, is adsorbed onto the CuZnO. However, due to this adsorption, it becomes necessary to increase the volume of the CuZnO catalyst. This results in an increase in a size and cost of the hydrodesulfurization unit.

In a case where the hydrodesulfurization catalyst includes a CuZn-based catalyst, a desulfurization capability degrades if the amount of the unhydrogenated sulfur compound which is adsorbed onto a surface of CuZnO increases.

The present invention has been made based on the above described findings.

Hereinafter, embodiments of the present invention will be described with reference to the drawings. Throughout the drawings, the same or corresponding components are designated by the same reference symbols and will not be described in repetition.

Embodiment 1

A hydrogen generation device according to Embodiment 1 comprises a reformer for generating a hydrogen-containing gas using a raw material; a first desulfurization unit for adsorbing and desulfurizing a sulfur compound from the raw material supplied to the reformer; a second desulfurization unit for hydrodesulfurizing the sulfur compound from the raw material supplied to the reformer; a first path used to supply the raw material to the reformer through at least the first desulfurization unit; a second path used to supply the raw material to the reformer through only the second desulfurization unit of the first desulfurization unit and the second desulfurization unit; a switch unit for performing switching between the first path and the second path; a third path used to supply the hydrogen-containing gas generated in the reformer to the second desulfurization unit; a flow control unit which selectively enables or inhibits a flow of the hydrogen-containing gas from an upstream end of the third path toward a downstream end of the third path; and a controller configured to execute processing in such a manner that in at least either a time point before generation of the hydrogen-containing gas is stopped, or start-up, the switch unit performs switching to select the first path, and the flow control unit enables the flow of the hydrogen-containing gas, while the reformer is generating the hydrogen-containing gas.

In accordance with this configuration, it becomes possible to reduce a possibility that a problem occurs due to the fact that a sulfur compound which is not converted into hydrogen sulfide is adsorbed onto a hydrodesulfurization catalyst, as compared to a conventional example.

In the hydrogen generation device according to Embodiment 1, the second desulfurization unit may include a CoMo-based catalyst.

In the hydrogen generation device according to Embodiment 1, the second desulfurization unit may include a CuZn-based catalyst.

According to Embodiment 1, there is provided a method of operating a hydrogen generation device for generating a hydrogen-containing gas, comprising the steps of: supplying a raw material, which has passed a first desulfurization unit for removing a sulfur compound from the raw material, to the reformer; and supplying the hydrogen-containing gas generated in the reformer to a second desulfurization unit for hydrodesulfurizing the sulfur compound from the raw material, wherein both of the steps are executed in at least either a time point before generation of the hydrogen-containing gas is stopped or start up.

In accordance with this configuration, it becomes possible to reduce a possibility that a problem occurs due to the fact that the sulfur compound which is not converted into hydrogen sulfide is adsorbed onto the hydrodesulfurization catalyst, as compared to a conventional example.

Hereinafter, an example of the hydrogen generation device according to Embodiment 1 will be specifically described.

[Configuration]

FIG. 1 is a block diagram showing an exemplary configuration of a hydrogen generation device according to Embodiment 1. As shown in FIG. 1, the hydrogen generation device according to Embodiment 1 includes a reformer 1, a first desulfurization unit 2, a second desulfurization unit 3, a branch passage 4, a raw material passage 5, a switch unit 6, a recycle passage 7, a flow control unit 8, a raw material supply unit 9 and a controller 12.

The reformer 1 generates a hydrogen-containing gas using the raw material. For example, the reformer 1 includes a reforming catalyst (not shown). The reformer 1 generates a hydrogen-containing gas by proceeding a steam reforming reaction using the raw material and steam by an action of the reforming catalyst. As the reforming catalyst, for example, a Ru catalyst, a Ni catalyst, etc., is used. The generated hydrogen-containing gas is sent out through an exit of the reformer 1. The raw material is supplied to the reformer 1 through a raw material supply path as will be described later. The steam is supplied to the reformer 1 through a water supply path (not shown). The reformer 1 is heated up to a predetermined temperature (e.g., 650 degrees C.) by a heater (not shown), and thus is supplied with heat required for the steam reforming reaction. At a downstream side of the reformer 1, there may be provided at least one of a shift converter (not shown) for reducing carbon monoxide in the hydrogen-containing gas generated in the reformer 1 by a shift reaction, and a CO reducing unit (not shown) for reducing carbon monoxide in the hydrogen-containing gas by at least either an oxidation reaction or a methanation reaction. The reforming reaction proceeding in the reformer 1 is not limited to the above stated steam reforming reaction, but may be any reforming reaction so long as the hydrogen-containing gas is generated through the reaction using the raw material. For example, the reforming reaction may be a partial oxidation reaction or an autothermal reaction.

A downstream end of the raw material supply path is connected to an entrance of the reformer 1. An upstream end of the raw material supply path is connected to a raw material supply source (not shown). The raw material is a gas containing an organic compound including at least hydrogen and carbon as elements. As examples of the raw material, there are hydrocarbon gases such as a city gas including methane as a major component, a natural gas and LPG. The raw material contains a sulfur compound which is an odorous component or originates from the raw material. As examples of the raw material source, there are an infrastructure of the raw material, a tank for storing the raw material, etc. The raw material supply path is configured to include the branch passage 4, the raw material passage 5, and the switch unit 6. The raw material from the raw material source is supplied to the switch unit 6. The switch unit 6 performs switching of a supply destination of the supplied raw material between the branch passage 4 and the raw material passage 5. The switch unit 6 is constituted by, for example, a three-way valve, on-off valves provided in the branch passage 4 and the raw material passage 5, respectively, etc. The branch passage 4 and the raw material passage 5 are joined together at a joint 11.

The branch passage 4 is provided with a first desulfurization unit 2. The first desulfurization unit 2 removes the sulfur compound from the raw material at a room temperature by physical adsorption/desulfurization. The "room temperature" means a temperature that is relatively closer to a room temperature range than a use temperature (typically, about 300 degrees C.) of a hydrodesulfurization catalyst, and falls in a range from the room temperature range to a temperature at which a desulfurization agent used in the first desulfurization unit 2 works effectively. As examples of the desulfurization agent, for example, there are a zeolite-based adsorbing agent in which Ag removing the odorous component is ion-exchanged, active carbon, etc.

The raw material passage 5 is a passage used to flow the raw material supplied to the reformer 1 through only the second desulfurization unit 3 of the first desulfurization unit 2 and the second desulfurization unit 3. In the present embodiment, the raw material passage 5 bypasses the first desulfurization unit 2, passes through only the second desulfurization unit 3 and is connected to the reformer 1.

On the raw material passage 5, the raw material supply unit 9 and the second desulfurization unit 3 are provided in this order. The raw material supply unit 9 adjusts a flow (flow rate) of the raw material supplied to the reformer 1. The raw material supply unit 9 includes, for example, a booster such as a booster pump and a flow control valve. The raw material supply unit 9 is not limited to this and may be either one of the booster and the flow control valve.

The second desulfurization unit 3 hydrodesulfurizes the sulfur compound from the raw material. As examples of hydrodesulfurization catalyst, for example, there are first to third hydrodesulfurization catalysts. The first hydrodesulfurization catalyst is configured such that the CoMo-based catalyst and the ZnO catalyst are placed in this order in the flow of the raw material. The second hydrodesulfurization catalyst is configured such that the CoMo-based catalyst and the CuZnO catalyst are placed in this order in the flow of the raw material. The third hydrodesulfurization catalyst is configured to include the CuZn-based catalyst.

In the first hydrodesulfurization catalyst, the CoMo-based catalyst converts the sulfur compound in the raw material into hydrogen sulfide. Hydrogen sulfide produced by the conversion is chemically adsorbed onto the ZnO catalyst.

In the second hydrodesulfurization catalyst, the CoMo-based catalyst converts the sulfur compound in the raw material into hydrogen sulfide. Hydrogen sulfide produced by the conversion is chemically adsorbed onto the CuZnO catalyst. The second hydrodesulfurization catalyst may include both of the ZnO-based catalyst and the CuZn-based catalyst as the chemical adsorbing agents of hydrogen sulfide. Which of the ZnO-based catalyst and the CuZn-based catalyst is placed at an upstream side does not matter.

In the third hydrodesulfurization catalyst, the CuZn-based catalyst converts the sulfur compound in the raw material into hydrogen sulfide. Hydrogen sulfide produced by the conversion is adsorbed onto the CuZn-based catalyst. The CuZn-based catalyst is able to also adsorb the sulfur compound in the raw material which is not converted into hydrogen sulfide.

The second desulfurization unit 3 carries out hydrodesulfurization at a specified temperature (e.g., 300 to 400 degrees C.) higher than a room temperature. The specified temperature is set to include at least a portion of the use temperature of the hydrodesulfurization catalyst. The use temperature refers to a temperature suitable for use of the hydrodesulfurization catalyst, at which a desulfurization capability is exercised properly.

In the present example, the second desulfurization unit 3 is placed in the vicinity of the reformer 1, and is configured to be heated by heat transmitted from the reformer 1.

Alternatively, the second desulfurization unit 3 may be heated by a heat source independent of the reformer 1, such as an electric heater, or heated by heat transmitted from at least one of the shift converter (not shown) and the CO removing unit (not shown).

The hydrogen generation device of Embodiment 1 includes a first path 31 used to supply the raw material to the reformer 1 through at least the first desulfurization unit 2, and a second path 32 used to supply the raw material to the reformer through only the second desulfurization unit, of the first desulfurization unit and the second desulfurization unit.

The second path 32 is constituted by the raw material passage 5. The first path 31 is constituted by the branch passage 4 and a portion of the raw material passage 5 which is located downstream of the joint 11. In the present embodiment, the first path 31 is configured such that the raw material is supplied to the reformer 1 through the first desulfurization unit 2 and the second desulfurization unit 3. However, the first path 31 is not limited to the present example, so long as the first path 31 is configured such that the raw material passes through at least the first desulfurization unit 2. Another configuration of the first path 31 will be described in detail later in modified example 1 of Embodiment 1. The switch unit 6 serves to switch the supply path through which the raw material is supplied to the reformer 1, between the first path 31 and the second path 32.

The hydrogen generation device of Embodiment 1 includes a third path used to supply the hydrogen-containing gas generated in the reformer 1 to the second desulfurization unit 3. In Embodiment 1, the third path is constituted by a recycle passage 7. The recycle passage 7 is provided with an on-off valve 8 as an example of a flow control unit. The flow control unit is not limited to the present example so long as it is able to selectively enable or inhibit the flow of the hydrogen-containing gas from an upstream end of the recycle passage 7 toward a downstream end of the recycle passage 7. Another example of the flow control unit will be described in Embodiment 3 to 6.

In the present embodiment, the downstream end of the recycle passage 7 is joined to a portion of the raw material passage 5 which is located between the raw material supply unit 9 and the joint 11. The upstream end of the recycle passage 7 is connected to a gas passage which is provided downstream of the reformer 1. With this configuration, the hydrogen-containing gas generated in the reformer 1 is added to the raw material, which is then supplied to the second desulfurization unit 3.

In the case where at least one of the shift converter and the CO reducing unit is provided as described above, the upstream end of the recycle passage 7 may be connected to any location so long as it is connected to the gas passage which is provided downstream of the reformer 1. The upstream end of the recycle passage 7 may be connected to, for example, a gas passage which is provided between the reformer 1 and a reactor located downstream of the reformer 1, a gas passage provided downstream of the shift converter, or a gas passage provided downstream of the CO reducing unit. Or, the recycle passage 7 may be provided with a condenser (not shown) for lowering a dew point of the recycled gas.

The downstream end of the recycle passage 7 is not limited to the above example, and may be connected to any location so long as it is a path provided upstream of the second desulfurization unit 3. In the hydrogen generation device of the present embodiment, the path provided upstream of the second desulfurization unit 3 is either the first path 31 or the second path 32. Note that in a case where the downstream end of the recycle passage 7 is connected to a path (raw material passage 5) which is provided upstream of the second desulfurization unit 3 and downstream of the raw material supply unit 9, the recycle passage 7 may be provided with a suitable booster.

The controller 12 controls the switch unit 6 and the flow control unit. Specifically, the controller 12 is configured to execute processing in such a manner that in at least either a time point before generation of the hydrogen-containing gas is stopped, or start-up, while the reformer 1 is generating the hydrogen-containing gas, the switch unit 6 performs switching to select the first path 31, and the flow control unit enables the flow of the hydrogen-containing gas. It is sufficient that the controller 12 has a control function. The controller 12 includes a processor section (not shown) and a storage section (not shown) for storing control programs. As examples of the processor section, there are MPU and CPU. As an example of the storage section, there is a memory. The controller 12 may be a single controller or a controller group in which a plurality of controllers cooperate with each other to execute control. The processor section of the controller 12 reads the control program stored in the storage section and executes it, thereby executing control as will be described later.

[Operation]

Next, an exemplary operation of the hydrogen generation device configured as described above, will be described. The operation of the hydrogen generation device is executed under control of the controller 12.

Figure 2:
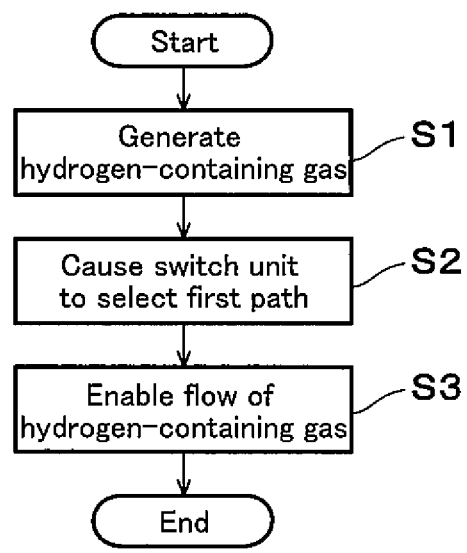
FIG. 2 is a flowchart showing an exemplary processing operation of a hydrogenated sulfur compound in the hydrogen generation device of FIG. 1.

FIG. 2 is a flowchart showing an exemplary operation of the hydrogen generation device of FIG. 1. As shown in FIG. 2, the controller 12 executes processing in such a manner that in at least either the time point before generation of the hydrogen-containing gas is stopped, or start-up, while the reformer 1 is generating the hydrogen-containing gas (step S1), the switch unit 6 performs switching to select the first path 31, and the flow control unit enables the hydrogen-containing gas to flow from the upstream end of the recycle passage 7 toward the downstream end of the recycle passage 7 (step S2, step S3). At this time, the on-off valve 8 which is the flow control unit is opened to enable the flow of the hydrogen-containing gas. The phrase "generation of the hydrogen-containing gas is stopped" means that supplying of the raw material to the reformer 1 is stopped in the middle of the generation of the hydrogen-containing gas. Typically, when the hydrogen generation device is stopped, the controller 12 causes the raw material supply unit 9 to stop supplying of the raw material to the reformer 1.

So long as there is a period in which step S1 to step S3 are performed concurrently, step S1 to step S3 may be initiated in a desired order. That is, the three steps may be all initiated at the same time, or otherwise, one, two or all of these steps may be initiated at different timings. In the latter case, step S1 to step S3 may be initiated in any order.

Hereinafter, a description will be specifically given of three examples of the operation of the hydrogen generation device, which are performed at respective timings when the above processing is executed.

Operation Example 1

In operation example 1, when the hydrogen generation device is stopped, the following processing is executed.

Specifically, when the reformer 1 is generating the hydrogen-containing gas, the switch unit 6 performs switching to select the second path 32, and the on-off valve 8 which is the flow control unit is opened to enable the flow of the hydrogen-containing gas. That is, the raw material supplied to the reformer 1 bypasses the first desulfurization unit 2, and is added with a part of the hydrogen-containing gas generated in the reformer 1 via the recycle passage 7. Then, the raw material added with the hydrogen-containing gas is supplied to the second desulfurization unit 3, which hydrodesulfurizes the raw material, and supplies the hydrodesulfurized raw material to the reformer 1. When the hydrogen generation device is stopped, the controller 12 causes the raw material supply unit 9 to continue supplying of the raw material to the reformer 1, the reformer 1 to generate the hydrogen-containing gas, and the on-off valve 8 to be opened to enable the flow of the hydrogen-containing gas. In this state, the controller 18 causes the switch unit 6 to perform switching to select the first path 31 in place of the second path 32.

The phrase "when the hydrogen generation device is stopped" means that the reformer 1 is going to stop generation of the hydrogen-containing gas soon. Specifically, as examples of "when the hydrogen generation device is stopped", there are a time which is when planned stop time of the hydrogen generation device is approaching, when an operator inputs a stop command of the hydrogen generation device via a manipulation device (e.g., remote controller), etc.

After that, the controller 12 causes the raw material supply unit 9 to stop supplying of the raw material to the reformer 1, and the on-off valve 8 which is the flow control unit to be closed to inhibit the flow of the hydrogen-containing gas, thereby stopping the hydrogen generation device. That is, before the generation of the hydrogen-containing gas in the reformer 1 is stopped, i.e., prior to stop of the generation of the hydrogen-containing gas in the reformer 1, the above processing is executed.

In the conventional hydrogen generation device, for a period that lapses before supplying of the raw material to the reformer 1 is stopped, during generation of the hydrogen-containing gas, the switch unit 6 maintains the state in which the second path 32 is selected. Therefore, the hydrogen-containing gas supplied to the second desulfurization unit 3 is consumed in a hydrogenation reaction of the sulfur compound contained in the raw material gas which is newly supplied to the second desulfurization unit 3 and from which the sulfur compound is not removed yet. Therefore, the hydrogen generation device is stopped in a state in which the unhydrogenated sulfur compound is left on the hydrodesulfurization catalyst of the second desulfurization unit 3. Then, at next start-up of the hydrogen generation device, when the raw material is supplied to the second desulfurization unit 3, a problem may arise in some cases.

This will be described specifically. In a case where a hydrogen sulfide adsorbing agent in a subsequent stage is the ZnO-based catalyst, like the first hydrodesulfurization catalyst, the above desorbed sulfur compound is not hydrogen sulfide, and therefore is not removed by the ZnO-based catalyst, but flows into the reforming catalyst. By comparison, in a case where a hydrogen sulfide adsorbing agent in a subsequent stage is the CuZn-based catalyst, like the second hydrodesulfurization catalyst, this unhydrogenated sulfur compound which is desorbed, is physically adsorbed onto the CuZn-based catalyst.

Adsorbing and removing of the unhydrogenated sulfur compound, which is physical adsorption, requires a greater adsorbing capacity than adsorbing and removing of hydrogen sulfide, which is chemical adsorption. If an attempt is made to ensure an adsorbing capacity of the CuZn-based catalyst for the unhydrogenated sulfur compound, which is desorbed from the CoMo-based catalyst, a size and cost of the second desulfurization unit increase. Also, in a case where the hydrodesulfurization catalyst is the third hydrodesulfurization catalyst, the amount of the unhydrogenated sulfur compound which is adsorbed onto the surface of CuZnO increases, causing its desulfurization capability to degrade. As a result, sulfur poisoning of the reforming catalyst will progress.

In contrast, in the present operation example 1, in the above stated processing, the raw material which has been desulfurized by the first desulfurization unit 2, is supplied to the second desulfurization unit 3, and the hydrogen-containing gas is generated in the reformer 1 and supplied to the second desulfurization unit 3. At this time, the unhydrogenated sulfur compound adhering onto the hydrodesulfurization catalyst is hydrogenated and hydrogen sulfide generated by the hydrogenation is adsorbed and removed.

Thus, the hydrogen generation device of the present embodiment is able to reduce a possibility of a problem caused by the fact that, at start-up, the unhydrogenated sulfur compound left on the hydrodesulfurization catalyst of the second desulfurization unit 3, is supplied to the reformer along with the raw material, as compared to the conventional hydrogen generation device.

Operation Example 2

In operation example 2, at-start up, the hydrogen generation device executes the following processing. Specifically, at-start up, the controller 12 raises the temperature of the reformer 1 and the temperature of the second desulfurization unit 3. When the temperature of the reformer 1 reaches a temperature at which the hydrogen-containing gas can be generated, the controller 12 supplies the steam to the reformer 1 and causes the raw material supply unit 9 to supply the raw material to the reformer 1, thus initiating generation of the hydrogen-containing gas in the reformer 1.

Also, in a state in which the temperature of the second desulfurization unit 3 is a temperature at which the hydrodesulfurization is enabled to proceed, the controller 12 causes the on-off valve 8 which is the flow control unit to be opened to enable the flow of the hydrogen-containing gas and the switch unit 6 to perform switching to select the first path 31. Thus, in a state in which the raw material which has been desulfurized by the first desulfurization unit 2, is supplied to the second desulfurization unit 3, the hydrogen-containing gas generated in the reformer 1 is supplied to the second desulfurization unit 3. Therefore, as described above, the unhydrogenated sulfur compound adhering onto the hydrodesulfurization catalyst is hydrogenated and hydrogen sulfide generated by the hydrogenation is adsorbed and removed.

As a result, it becomes possible to reduce a possibility of a problem caused by the unhydrogenated sulfur compound left on the hydrodesulfurization catalyst of the second desulfurization unit 3, as compared to the conventional hydrogen generation device.

After that, the controller 12 causes the switch unit 6 to perform switching to select the second path 32.

Operation Example 3

In operation example 3, at start-up of the hydrogen generation device, the controller 12 causes the hydrogen generation device to operate as in the operation example 2, while during a hydrogen generation operation of the hydrogen generation device and at stop of the hydrogen generation device, the controller 12 causes the hydrogen generation device to operate as in the operation example 1. This makes it possible to reduce a possibility of a problem caused by the unhydrogenated sulfur compound left on the hydrodesulfurization catalyst of the second desulfurization unit 3, as compared to the conventional hydrogen generation device.

Next, modified example of the hydrogen generation device of Embodiment 1 will be described.

Modified Example 1

Figure 3:
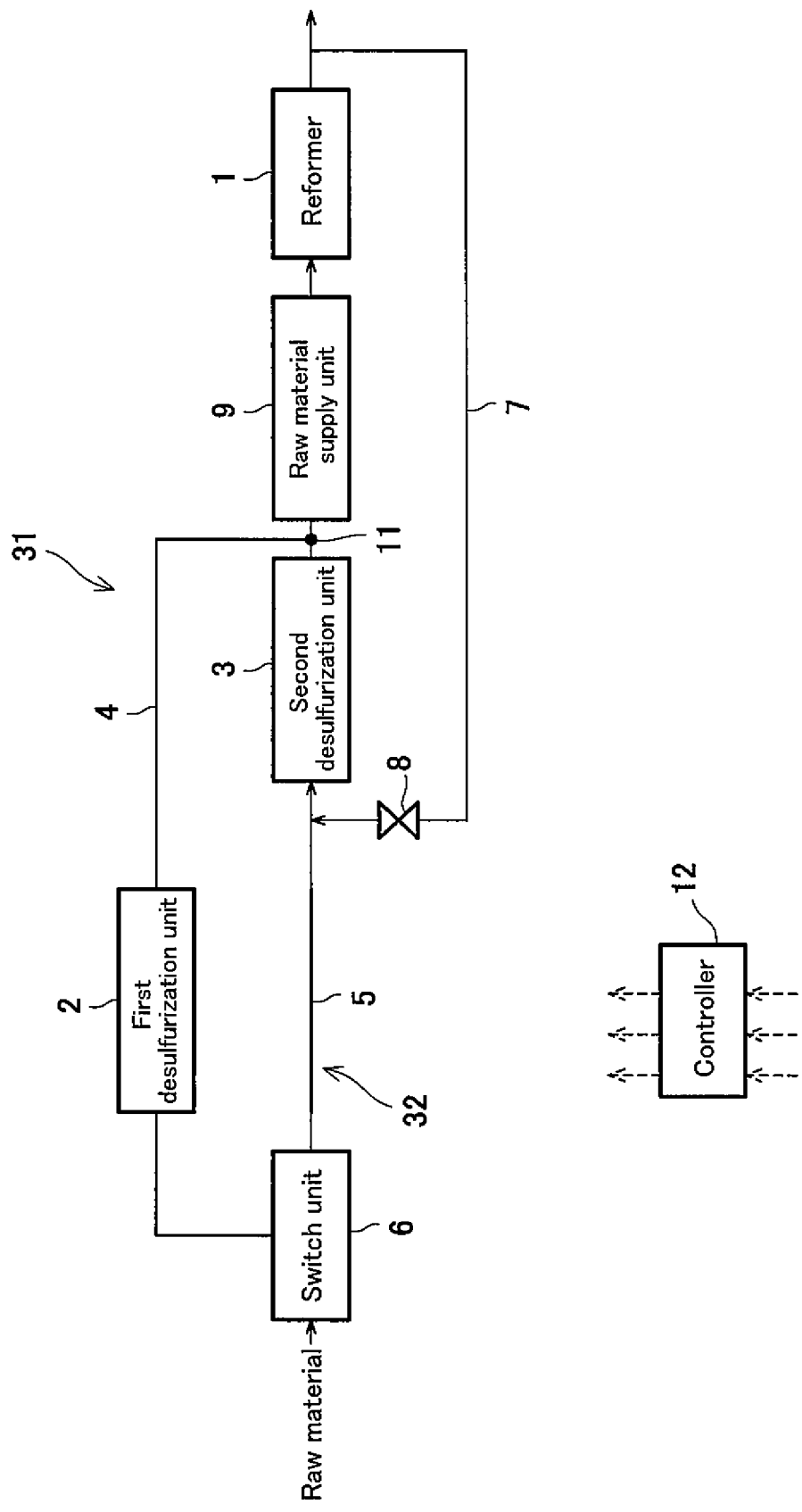
FIG. 3 is a block diagram showing an exemplary configuration of a hydrogen generation device according to modified example 1 of Embodiment 1.

FIG. 3 is a block diagram showing an exemplary configuration of the hydrogen generation device according to modified example 1 of Embodiment 1. As shown in FIG. 3, in modified example 1, the first path 31 is configured such that the raw material is supplied to the reformer 1 only through the first desulfurization unit 2. Except for this, the configuration of modified example 1 is identical to that of Embodiment 1 (configuration of FIG. 1). Specifically, the downstream end of the branch passage 4 is joined at the joint 11 to a portion of the raw material passage 5 which is located downstream of the second desulfurization unit 3. In FIG. 3, the other components which are designated by the same reference symbols as those in FIG. 1 are identical to those of Embodiment 1, and will not be described in detail.

In accordance with this configuration, at stop of the hydrogen generation device and/or at start-up of the hydrogen generation device, when the controller 12 executes processing in such a manner that while the reformer 1 is generating the hydrogen-containing gas, the switch unit 6 performs switching to select the first path 31, and the on-off valve 8 which is the flow control unit is opened to enable the flow of the hydrogen-containing gas, the raw material supply unit 9 supplies the raw material having been desulfurized by the first desulfurization unit 2, to the reformer 1, and the hydrogen-containing gas generated in the reformer 1 is supplied to the second desulfurization unit 3 via the recycle passage 7. Thereby, as described above, the unhydrogenated sulfur compound adhering onto the hydrodesulfurization catalyst of the second desulfurization unit 3, is hydrogenated, and as a result, it becomes possible to reduce a possibility of a problem caused by the unhydrogenated sulfur compound left on the hydrodesulfurization catalyst of the second desulfurization unit 3, as compared to the conventional hydrogen generation device. When the controller 12 causes the switch unit 6 to perform switching to select the second path 32, the raw material which has passed through only the second desulfurization unit 3 is supplied to the reformer 1, as in the configuration of FIG. 1.

Modified Example 2

In a hydrogen generation device according to modified example 2, the controller is configured to execute processing in such a manner that when an operation (running) time passes a first time threshold, during the operation of the hydrogen generation device, the switch unit performs switching to select the first path, and the flow control unit enables flow of the hydrogen-containing gas, while the reformer is generating the hydrogen-containing gas, in the hydrogen generation device of Embodiment 1 or modified example 1.

With this configuration, as compared to the hydrogen generation device of Embodiment 1, it becomes possible to reduce a period for which the above processing is executed in at least either the time point before generation of the hydrogen-containing gas is stopped, or start-up.

A timing when the measurement of the operation time starts is set as desired. For example, the timing when the measurement of the operation time starts may be time when supplying of the raw material to the second desulfurization unit 3 starts, time when generation of the hydrogen-containing gas in the reformer 1 starts, etc.

The first time threshold is time by which it is determined that the above processing should be executed and is set as desired. For example, as will be described later, in a case where the hydrogen generation device is incorporated into the fuel cell system, the first time threshold is 24 h from start of power generation (start-up of hydrogen generation device). It should be noted that the first time threshold may be changed based on a power generation history of each customer who utilizes the fuel cell system.

Modified Example 3

In a hydrogen generation device according to modified example 3, the first time threshold is set according to an accumulated supply amount of the raw material supplied to the second desulfurization unit, in the hydrogen generation device of modified example 2. With this configuration, as compared to Embodiment 1, it becomes possible to reduce a period for which the above processing is executed in at least either the time point before generation of the hydrogen-containing gas is stopped, or start-up.

Modified Example 4

In a hydrogen generation device according to modified example 4, the controller is configured to execute processing in such a manner that the switch unit performs switching to select the first path, and the flow control unit enables flow of the hydrogen-containing gas, while the reformer is generating the hydrogen-containing gas, for a predetermined time or longer, in the hydrogen generation device of any one of Embodiment 1 and modified examples 1 to 3. The predetermined time is set to a time required to supply the hydrogen-containing gas generated in the reformer to the second desulfurization unit and to hydrogenate the unhydrogenated sulfur compound adhering onto the hydrodesulfurization catalyst of the second desulfurization unit. This time is decided through an experiment, etc. The "predetermined time" may be set according to the accumulated supply amount of the raw material supplied to the second desulfurization unit.

With this configuration, it becomes possible to appropriately hydrogenate and remove the unhydrogenated sulfur compound adhering onto the hydrodesulfurization catalyst of the second desulfurization unit.

Modified Example 5

In a hydrogen generation device according to modified example 5, the controller is configured to cause the switch unit to perform switching to select the second path when the temperature of the hydrodesulfurization catalyst provided in the second desulfurization unit is its use temperature, in the hydrogen generation device of any one of Embodiment 1 and modified examples 1 to 4.

With this configuration, the undesulfurized raw material is supplied to the second desulfurization unit, but the temperature of the hydrodesulfurization catalyst provided in the second desulfurization unit has reached its use temperature, and therefore its desulfurization capability is exercised properly.

Hereinafter, an example of the hydrogen generation device of the present modified example will be specifically described.

The hydrogen generation device of the present modified example is configured like the hydrogen generation device of Embodiment 1 shown in FIG. 1, and will not be described in detail.

Next, an exemplary operation of the hydrogen generation device of the present modified example will be described.

In the hydrogen generation device of the present modified example, the controller 12 is configured to cause the switch unit 6 to perform switching to select the second path 32 when the temperature of the hydrodesulfurization catalyst provided in the second desulfurization unit 3 is its use temperature. At this time, the on-off valve 8 is opened to enable the hydrogen-containing gas to flow from the upstream end of the recycle passage 7 to the downstream end of the recycle passage 7.

Step S3 of FIG. 2 is executed. Thus, the switch unit 6 selects the first path 31, and the on-off valve 8 is kept to be opened. Thereafter, the switch unit 6 performs switching to select the second path 32. Its timing is set as desired. For example, the switch unit 6 may perform switching to select the second path 32, when the temperature of the hydrodesulfurization catalyst provided in the second desulfurization unit 3 is its use temperature, or when the temperature of the hydrodesulfurization catalyst provided in the second desulfurization unit 3 is lower than its use temperature.

Embodiment 2

In a hydrogen generation device according to Embodiment 2, the controller is configured to, in the above stated processing at start-up, cause the flow control unit to initiate flowing of the hydrogen-containing gas, when the temperature of the hydrodesulfurization catalyst provided in the second desulfurization unit is lower than its use temperature, in the hydrogen generation device of any one of Embodiment 1 and modified examples 1 to 5.

With this configuration, as compared to a case where the above processing is initiated after the temperature of the hydrodesulfurization catalyst provided in the second desulfurization unit reaches its use temperature, a period for which the first desulfurization unit is used can be reduced. Therefore, it becomes possible to achieve a reduction of a capacity of the first desulfurization unit and hence reduction of cost.

The hydrogen generation device of the present embodiment may be configured like the hydrogen generation device of any one of Embodiment 1, and modified examples 1 to 5, except for the above features.

Figure 4:
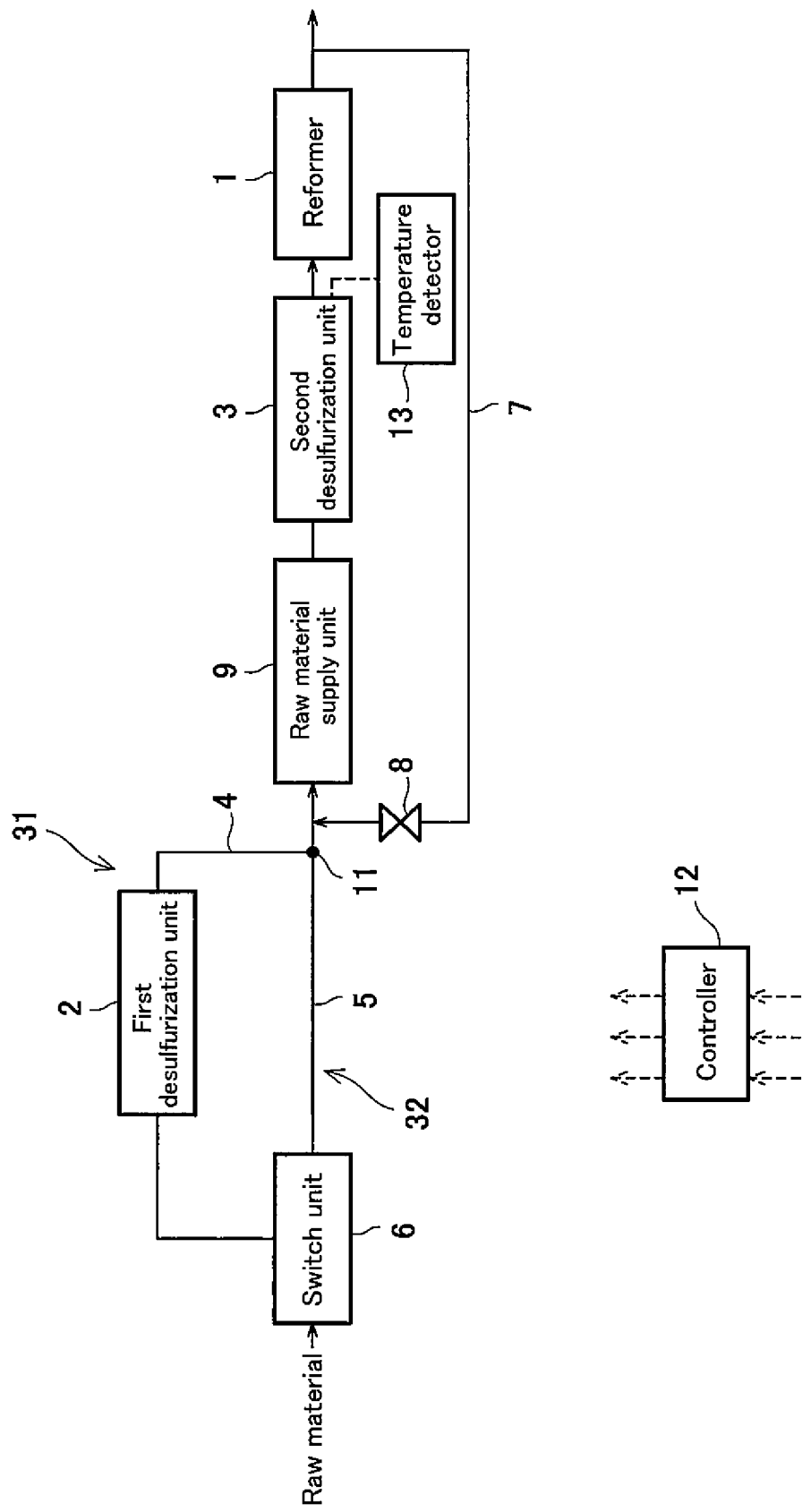
FIG. 4 is a block diagram showing an exemplary configuration of a hydrogen generation device according to Embodiment 2.

FIG. 4 is a block diagram showing an exemplary configuration of the hydrogen generation device according to Embodiment 2.

In the hydrogen generation device of Embodiment 2, the controller 12 is configured to execute the above processing in such a manner that when the temperature of the hydrodesulfurization catalyst provided in the second desulfurization unit 3 is lower than its use temperature, at start-up, the switch unit 6 performs switching to select the first path 31, and in this state, the on-off valve 8 which is an example of the flow control unit is opened to enable the flow of the hydrogen-containing gas, while the reformer 1 is generating the hydrogen-containing gas. The above stated temperature which is lower than the use temperature of the hydrodesulfurization catalyst provided in the second desulfurization unit 3, is set as desired. The use temperature of the hydrodesulfurization catalyst is a temperature suitable for use of the hydrodesulfurization catalyst. Normally, even under a temperature lower than the use temperature, the hydrodesulfurization reaction proceeds. Therefore, even when the hydrogen-containing gas is supplied to the second desulfurization unit, under a state of a temperature which is lower than the use temperature of the hydrodesulfurization catalyst but allows the hydrodesulfurization reaction to proceed, the unhydrogenated sulfur compound on the hydrodesulfurization catalyst is hydrogenated into hydrogen sulfide, which is adsorbed and removed.

After that, the controller 12 causes the switch unit 6 to perform switching to select the second path 32, and raises the temperature of the second desulfurization unit 3. The other configuration is identical to that of the operation example 2 of the hydrogen generation device of Embodiment 1.

The hydrogen generation device of the present embodiment includes a detector for detecting the temperature of the hydrodesulfurization catalyst provided in the second desulfurization unit 3. This detector may directly or indirectly detect the temperature of the select desulfurization unit 3. The phrase "the detector directly detects" means that it detects the temperature of the hydrodesulfurization catalyst provided in the second desulfurization unit 3. The phrase "the detector indirectly detects" means that it detects a physical amount (parameter) having a correlation with the temperature of the hydrodesulfurization catalyst provided in the second desulfurization unit 3.

The example of the hydrogen generation device of FIG. 4 includes a temperature detector 13 for detecting the temperature of the hydrodesulfurization catalyst provided in the second desulfurization unit 3, to directly detect the temperature of the hydrodesulfurization catalyst provided in the second desulfurization unit 3. As examples of the temperature detector 13, there is a temperature sensor such as a thermocouple or a thermistor. In a case where the second desulfurization unit 3 is configured to be heated by heat transmitted from the reformer 1, the detector for detecting the temperature of the hydrodesulfurization catalyst may be a temperature detector for detecting the temperature of the reformer 1. Based on the temperature of the reformer 1 detected by this temperature detector, the temperature of the second desulfurization unit 3 is indirectly detected. Or, the detector for detecting the temperature of the second desulfurization unit 3 may be a timer for detecting time that passes after the start-up of the hydrogen generation device. Based on the time measured by the timer, the temperature of the second desulfurization unit 3 is indirectly detected.

In a case where the hydrodesulfurization catalyst is a catalyst which desorbs the unhydrogenated sulfur compound if the gas is flowed under a temperature which is lower than its use temperature, the flow control unit (in the present example, on-off valve 8) is caused to initiate flowing of the hydrogen-containing gas under a temperature which is equal to or lower than an upper limit temperature at which the unhydrogenated sulfur compound adhering onto the hydrodesulfurization catalyst of the second desulfurization unit 3 is not desorbed therefrom.

A temperature threshold of the second desulfurization unit at which the flow control unit is caused to initiate flowing of the hydrogen-containing gas may be any temperature so long as it is equal to or lower than the use temperature and allows the unhydrogenated sulfur compound adhering onto the hydrodesulfurization catalyst of the second desulfurization unit 3 to be hydrogenated. The temperature threshold may be found through an experiment or the like.

The second desulfurization unit 3 may be configured such that its temperature is controllable independently of the reformer 1. For example, the second desulfurization unit 3 may be heated by a heater such as an electric heater which is separate from the reformer 1. Or, the second desulfurization unit 3 may be heated by the heat transmitted from the reformer 1 such that an amount of the heat is adjustable. In these configurations, the controller 12 controls the temperature of the second desulfurization unit 3 by controlling the amount of heat given to the second desulfurization unit 3.

Figure 5:
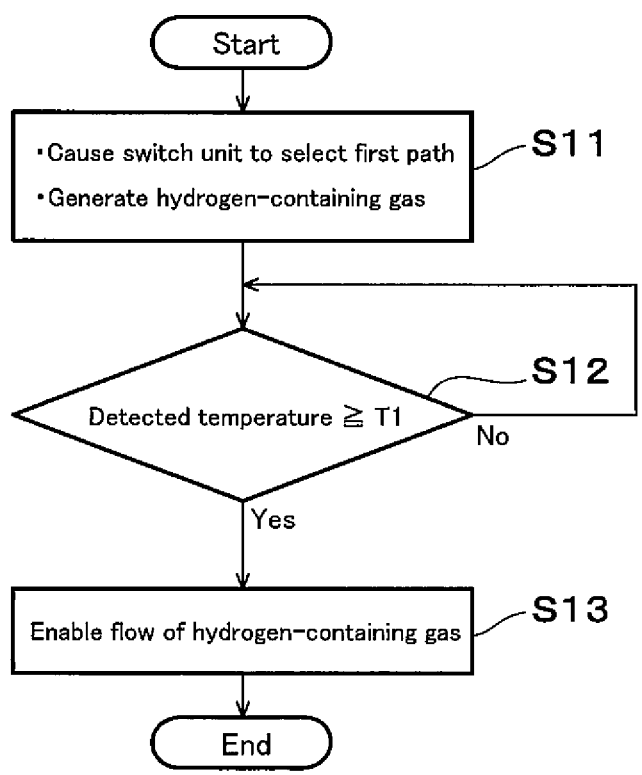
FIG. 5 is a flowchart showing an exemplary processing operation of a hydrogenated sulfur compound in the hydrogen generation device according to Embodiment 2.

FIG. 5 is a flowchart showing an exemplary processing operation of the hydrogen generation device according to Embodiment 3. As shown in FIG. 5, in Embodiment 2, at start-up of the hydrogen generation device, the controller 12 causes the switch unit 6 to perform switching to select the first path 31 and the reformer 1 to generate the hydrogen-containing gas, under a temperature which is equal to or lower than the use temperature of the hydrodesulfurization catalyst provided in the second desulfurization unit 3 (step S11). Specifically, at start-up, the controller 12 raises the temperature of the reformer 1 and the temperature of the second desulfurization unit 3. When the temperature of the reformer 1 has reached a temperature at which the reforming reaction can proceed, the switch unit 6 performs switching to select the first path 31, so that the raw material which has passed through the first desulfurization unit 2 is supplied to the reformer 1, which generates the hydrogen-containing gas.

The controller 12 determines whether or not the temperature detected by the temperature detector 13 is equal to or higher than a temperature threshold T1 (step S12). When the controller 12 determines that the temperature is equal to or higher than the temperature threshold T1 (Yes in step S12), it controls the flow control unit (on-off valve 8) to enable the flow of the hydrogen-containing gas (step S13). As a result, the hydrogen-containing gas is supplied to the second desulfurization unit 3 via the recycle passage 7. The temperature threshold T1 is defined as a temperature which is lower than the use temperature and allows the hydrodesulfurization reaction to proceed.

Embodiment 3

In a hydrogen generation device according to Embodiment 3, the second desulfurization unit may include a hydrodesulfurization catalyst which desorbs the unhydrogenated sulfur compound when the raw material is supplied to the second desulfurization unit under a temperature which is lower than the use temperature of the hydrodesulfurization catalyst, and the controller may control the flow control unit to enable the flow of the hydrogen-containing gas, under a temperature which is equal to or lower than the upper limit temperature at which the unhydrogenated sulfur compound is not desorbed from the hydrodesulfurization catalyst, in the hydrogen generation device of any one of Embodiment 1, modified examples 1 to 5, and Embodiment 2.

In a case where the hydrodesulfurization catalyst includes the CoMo-based catalyst, this upper limit temperature is desirably 150 degrees C.

The hydrogen generation device of the present embodiment may be configured like the hydrogen generation device of any one of Embodiment 1, modified examples 1 to 5, and Embodiment 2, except for the above features.

Hereinafter, an example of the hydrogen generation device according to Embodiment 3 will be specifically described.

A specific configuration of the hydrogen generation device according to Embodiment 3 is identical to that of Embodiment 2 of FIG. 4, and will not be described in detail.

In the hydrogen generation device of Embodiment 2, the second desulfurization unit 3 includes the hydrodesulfurization catalyst which desorbs the unhydrogenated sulfur compound if the raw material is supplied to the second desulfurization unit 3 under a temperature which is lower than the use temperature. The controller 12 executes the above processing in such a manner that at start-up, when the temperature of the hydrodesulfurization catalyst provided in the second desulfurization unit 3 is equal to or lower than the upper limit temperature at which the unhydrogenated sulfur compound is not desorbed from the hydrodesulfurization catalyst, the switch unit 6 performs switching to select the first path 31, and in this state, the on-off valve 8 which is an example of the flow control unit is opened to enable the flow of the hydrogen-containing gas, while the reformer 1 is generating the hydrogen-containing gas. In an example (hydrodesulfurization catalyst: CoMo-based catalyst) described later, the upper limit temperature is 150 degrees C. However, the upper limit temperature is different depending on the kind of hydrodesulfurization catalyst. A temperature threshold which is equal to or lower than the upper limit temperature, at which the flow control unit is caused to initiate flowing of the hydrogen-containing gas, may be any temperature so long as the temperature is equal to or lower than the above stated use temperature and allows the unhydrogenated sulfur compound adhering onto the hydrodesulfurization catalyst to be hydrogenated. This temperature threshold can be found through an experiment, etc. After that, the controller 12 causes the switch unit 6 to perform switching to select the second path 32, and raises the temperature of the second desulfurization unit 3. The other configuration is identical to that of the operation example 2 of the hydrogen generation device of Embodiment 1.

An exemplary processing operation of the hydrogen generation device according to Embodiment 3 will be described.

The specific processing operation of the hydrogen generation device according to Embodiment 3 is identical to that of Embodiment 2 except that the temperature threshold T1 is set to the temperature lower than the temperature which is equal to or lower than the upper limit temperature in place of the temperature lower than the use temperature, in the processing operation of Embodiment 2. It should be noted that the temperature threshold T1 is desirably a temperature which allows the hydrodesulfurization reaction to proceed.

Next, Examples of Embodiment 1, Embodiment 2, and Embodiment 3 will be described.

Example 1

In Examples of Embodiment 1, Embodiment 2, and Embodiment 3, the CoMo-based catalyst of 10 cc and the ZnO-based catalyst of 5 cc as the hydrodesulfurization catalysts were provided in a fixed bed flow reactor including an electric furnace, and experiments which simulated behaviors at stop and re-start-up of the hydrogen generation device were conducted. That is, the case where the hydrodesulfurization catalyst was the first hydrodesulfurization catalyst was simulated.

As the raw material, 13A (hereinafter will be referred to as desulfurized 13A) from which a sulfur component was removed by adsorption using a zeolite-based adsorbing/desulfurization agent was supplied to the fixed bed flow reactor with 50 cc/min This raw material was added with tert-butyl mercaptan (TBM) of 10 ppm as a sulfur component and hydrogen of 5 vol. %

Then, while supplying the raw material having been added with the sulfur component and hydrogen to the fixed bed flow reactor, hydrodesulfurization was conducted at 300 to 400 degrees C. After continuing to supply the raw material having been added with the sulfur component and hydrogen to the fixed bed flow reactor, for 450 h, supplying of TBM and supplying of hydrogen were stopped at the same time, the temperature of the electric furnace was lowered, and the temperature of the fixed bed flow reactor was lowered (simulated the stop operation in operation example 2 of Embodiment 1). After that, while supplying the desulfurized 13A to the fixed bed flow reactor, the temperature of the electric furnace was raised and the temperature of the fixed bed flow reactor was re-raised (simulated the start-up operation in operation example 1 of Embodiment 1). As a result, a sulfur component (TBM) of 1 to 2 ppm was detected in the gas which passed through the hydrodesulfurization catalyst at a temperature which was equal to or higher than 150 degrees C. In other words, desorption of the sulfur component (TBM) was observed when the temperature of the hydrodesulfurization catalyst was equal to or higher than 150 degrees C. Therefore, in the case where the hydrodesulfurization catalyst was the CoMo-based catalyst, the above stated upper limit temperature is 150 degrees C.

When 30 minutes passed after supplying of the TBM was stopped, supplying of hydrogen was stopped. Then, the temperature of the electric furnace was lowered, and the temperature of the fixed bed flow reactor was lowered. Then, supplying of the desulfurized 13A was stopped (simulated the stop operation in operation example 1 of Embodiment 1). After that, while supplying the desulfurized 13A to the fixed bed flow reactor, the temperature of the electric furnace was raised and the temperature of the fixed bed flow reactor was re-raised (simulated the start-up operation in operation example 1 of Embodiment 1). The sulfur component (TBM) of the gas which passed through the hydrodesulfurization catalyst was equal to or less than a detection limit (5 ppb). That is, desorption of the sulfur component (TBM) was not observed when the temperature of the hydrodesulfurization catalyst was equal to or higher than 150 degrees C. It was estimated that this was due to the fact that when the gas with hydrogen added to the desulfurized 13A was supplied to the hydrodesulfurization catalyst, while addition of TBM was stopped, the unhydrogenated sulfur compound adhering onto the CoMo-based catalyst was hydrogenated into hydrogen sulfide, which was adsorbed onto the ZnO-based catalyst to be removed. It was also estimated that if supplying of the desulfurized 13A was stopped, and only hydrogen was supplied, when supplying of TBM was stopped, the unhydrogenated sulfur compound was hydrodesulfurized, and sulfur component (TBM) became the detection limit or less when the temperature of the fixed bed flow reactor was re-raised, in the same manner.

Also, supplying of TBM and supplying of hydrogen were stopped at the same time, the temperature of the electric furnace was lowered, and the temperature of the fixed bed flow reactor was lowered (simulated the stop operation in operation example 2 of Embodiment 1). After that, while supplying the desulfurized 13A to the fixed bed flow reactor, the temperature of the electric furnace was raised and the temperature of the fixed bed flow reactor was re-raised. At a time point when the temperature reached 150 degrees C., addition of hydrogen to the desulfurized 13A was initiated (simulated the start-up operation in operation example 2 of Embodiment 1 and processing in Embodiment 2). At this time, the sulfur component (TBM) of the gas which passed through the hydrodesulfurization catalyst was equal to or less than the detection limit (5 ppb). In other words, desorption of the sulfur component (TBM) from the hydrodesulfurization catalyst was not observed when the temperature was equal to or higher than 150 degrees C. It was estimated that this was due to the fact that when the desulfurized 13A added with hydrogen was supplied under the state in which the temperature of the fixed bed flow reactor was re-raised, the unhydrogenated sulfur compound adhering onto the CoMo-based catalyst was hydrogenated into hydrogen sulfide, which was adsorbed onto the ZnO-based catalyst to be removed. It was also estimated that if the desulfurized 13A was not supplied under the state in which the temperature of the fixed bed flow reactor was re-raised, but supplying of only hydrogen was initiated at the time point when the temperature was 150 degrees C., the unhydrogenated sulfur compound was hydrodesulfurized and the sulfur component (TBM) became the detection limit or less at 150 degrees C. or higher in the same manner.

When 30 minutes passed after supplying of the TBM was stopped, supplying of hydrogen was stopped. Then, the temperature of the electric furnace was lowered, and the temperature of the fixed bed flow reactor was lowered. Then, supplying of the desulfurized 13A was stopped (simulated the stop operation in operation example 1 of Embodiment 1). Then, while supplying the desulfurized 13A to the fixed bed flow reactor, the temperature of the electric furnace was raised and the temperature of the fixed bed flow reactor was re-raised. At a time point when the temperature reached 150 degrees C., addition of hydrogen to the desulfurized 13A was initiated (simulated the start-up operation in operation example 2 of Embodiment 1 and processing in Embodiment 2). At this time, the sulfur component (TBM) of the gas which passed through the hydrodesulfurization catalyst was equal to or less than the detection limit (5 ppb). In other words, desorption of the sulfur component from the hydrodesulfurization catalyst was not observed when the temperature of the hydrodesulfurization catalyst was equal to or higher than 150 degrees C. It was estimated that if only hydrogen was supplied, without supplying the desulfurized 13A, in at least a time which was either when supplying of TBM was stopped or when temperature of the fixed bed flow reactor was re-raised, the unhydrogenated sulfur compound was hydrodesulfurized and the sulfur component (TBM) became the detection limit or less when temperature of the fixed bed flow reactor was re-raised, in the same manner. This experiment simulated the operation example 3 of Embodiment 1 as a whole.

As should be appreciated from above, the present example supported that a problem caused by the unhydrogenated sulfur compound adhering onto the hydrodesulfurization catalyst was mitigated more effectively, in the embodiments and modified examples than in the conventional example.

It was confirmed that in a case where the hydrodesulfurization catalyst was a catalyst which desorbed the unhydrogenated sulfur compound when the gas was supplied to the hydrodesulfurization catalyst under a temperature lower than its use temperature, desorption of the unhydrogenated sulfur compound from the catalyst did not occur if the hydrogen-containing gas was supplied to the second desulfurization unit 3 under a temperature which was equal to or lower than the upper limit temperature (150 degrees C.). If the switch unit 6 performs switching to select the first path 31 and in this state, the flow of the hydrogen-containing gas in the recycle passage 7 is enabled, under a temperature higher than the upper limit temperature (150 degrees C.), the unhydrogenated sulfur compound is thereafter hydrogenated into hydrogen sulfide, which is adsorbed onto the catalyst. Therefore, even in such a case, it is obvious that the problem caused by the unhydrogenated sulfur compound can be mitigated more effectively, than in the conventional hydrogen generation device.

Example 2

In Examples of Embodiment 1, Embodiment 2, and Embodiment 3, the CuZnO-based catalyst of 500 cc as the hydrodesulfurization catalyst was provided in the fixed bed flow reactor including the electric furnace, and experiments which simulated behaviors at stop and re-start-up of the hydrogen generation device were conducted. That is, the case where the hydrodesulfurization catalyst was the third hydrodesulfurization catalyst was simulated.

As the raw material, 13A (hereinafter will be referred to as desulfurized 13A) from which the sulfur component was removed by adsorption using the zeolite-based adsorbing/desulfurization agent was supplied to the fixed bed flow reactor with 3 L/min. This raw material was added with dimethyl sulfide (DMS) of 500 ppm as the sulfur component and hydrogen of 5 vol. %

Then, while supplying the raw material having been added with the sulfur component and hydrogen to the fixed bed flow reactor, hydrodesulfurization was conducted at 300 to 400 degrees C. After continuing to supply the raw material having been added with the sulfur component and hydrogen to the fixed bed flow reactor, for 81 h, supplying of DMS and supplying of hydrogen were stopped at the same time.

In an earlier stage, the sulfur component (DMS) in the gas which passed through the hydrodesulfurization catalyst was equal to or less than the detection limit (5 ppb). However, when 81 h passed after supplying of the raw material to the fixed bed flow reactor was initiated, the sulfur component (DMS) of 300 ppb was detected.

When 30 minutes passed after supplying of DMS was stopped, supplying of hydrogen was stopped. Then, the temperature of the electric furnace was lowered, and the temperature of the fixed bed flow reactor was lowered. Then, supplying of the desulfurized 13A was stopped (simulated the stop operation in operation example 1 of Embodiment 1). Then, while supplying the desulfurized 13A to the fixed bed flow reactor, the temperature of the electric furnace was raised and the temperature of the fixed bed flow reactor was re-raised (simulated the start-up operation in operation example 1 of Embodiment 1). As a result, the sulfur component (DMS) in the gas which passed through the hydrodesulfurization catalyst under the use temperature (in the present example, 250 degrees C.) of the hydrodesulfurization catalyst was equal to or less than the detection limit (5 ppb). It was estimated that this was due to the fact when the gas with hydrogen added to the desulfurized 13A was supplied to the hydrodesulfurization catalyst in a state in which addition of DMS was stopped, the unhydrogenated sulfur compound adhering onto the CuZnO-based catalyst was hydrodesulfurized, and thus a desulfurization capability of the CuZnO-based catalyst was restored. It was also estimated that if supplying of the desulfurized 13A was stopped, and only hydrogen was supplied, when supplying of DMS was stopped, the unhydrogenated sulfur compound was hydrodesulfurized, and the sulfur component (DMS) became the detection limit or less when the temperature of the fixed bed flow reactor was re-raised, in the same manner.

Also, supplying of DMS and supplying of hydrogen were stopped at the same time, the temperature of the electric furnace was lowered, and the temperature of the fixed bed flow reactor was lowered (simulated the stop operation in operation example 2 of Embodiment 1). After that, while supplying the desulfurized 13A to the fixed bed flow reactor, the temperature of the electric furnace was raised and the temperature of the fixed bed flow reactor was re-raised. When the temperature reached 130 degrees C., hydrogen was added to the desulfurized 13A (simulated the start-up operation in operation example 2 of Embodiment 1 and processing in Embodiment 2). At a time point when the temperature of the hydrodesulfurization catalyst reached the use temperature (in the present example, 250 degrees C.), the sulfur component (DMS) in the gas was equal to or less than the detection limit (5 ppb). It was estimated that this was due to the fact that when the desulfurized 13A added with hydrogen was supplied under the state in which the temperature of the fixed bed flow reactor was re-raised, the unhydrogenated sulfur compound adhering onto the CuZnO-based catalyst was hydrodesulfurized, and thus the desulfurization capability of the CuZnO-based catalyst was restored. It was also estimated that that if the desulfurized 13A was not supplied when the temperature of the fixed bed flow reactor was re-raised, and only hydrogen was supplied at a time when the temperature was 130 degrees C., the unhydrogenated sulfur compound was hydrodesulfurized, and the sulfur component (DMS) became the detection limit or less, in the same manner, when the temperature of the hydrodesulfurization catalyst was the use temperature (in the present example, 250 degrees C.).

When 30 minutes passed after supplying of DMS was stopped, supplying of hydrogen was stopped. Then, the temperature of the electric furnace was lowered, and the temperature of the fixed bed flow reactor was lowered. Then, supplying of the desulfurized 13A was stopped (simulated the stop operation in operation example 1 of Embodiment 1). Then, while supplying the desulfurized 13A to the fixed bed flow reactor, the temperature of the electric furnace was raised and the temperature of the fixed bed flow reactor was re-raised. At a time point when the temperature reached 130 degrees C., addition of hydrogen to the desulfurized 13A was initiated (simulated the start-up operation in operation example 2 of Embodiment 1 and processing in Embodiment 2). At this time, the sulfur component (DMS) of the gas which passed through the hydrodesulfurization catalyst was equal to or less than the detection limit (5 ppb). It was estimated that if only hydrogen was supplied, without supplying the desulfurized 13A, in at least a time which was either when supplying of DMS was stopped or when temperature of the fixed bed flow reactor was re-raised, the unhydrogenated sulfur compound was hydrodesulfurized and the sulfur component (DMS) became the detection limit or less when temperature of the fixed bed flow reactor was re-raised, in the same manner. This experiment simulated the operation example 3 of Embodiment 1 as a whole.

Embodiment 4

In Embodiment 4, another example of the flow control unit will be described.

Figure 6:
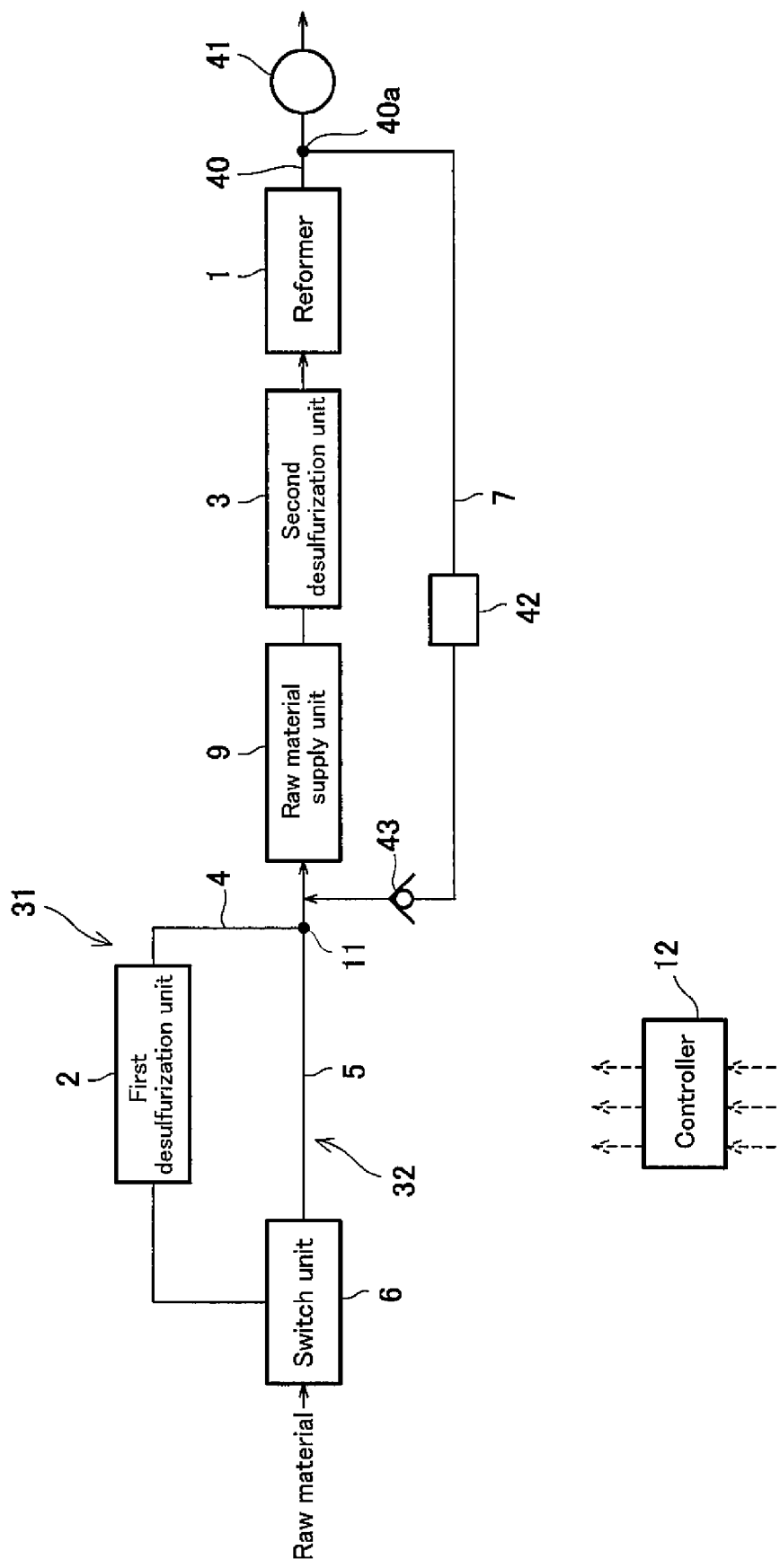
FIG. 6 is a block diagram showing a configuration in which an on-off valve 8 is replaced by another example of a flow control unit in the hydrogen generation device according to Embodiment 1, as a hydrogen generation device according to Embodiment 4.
Figure 7:
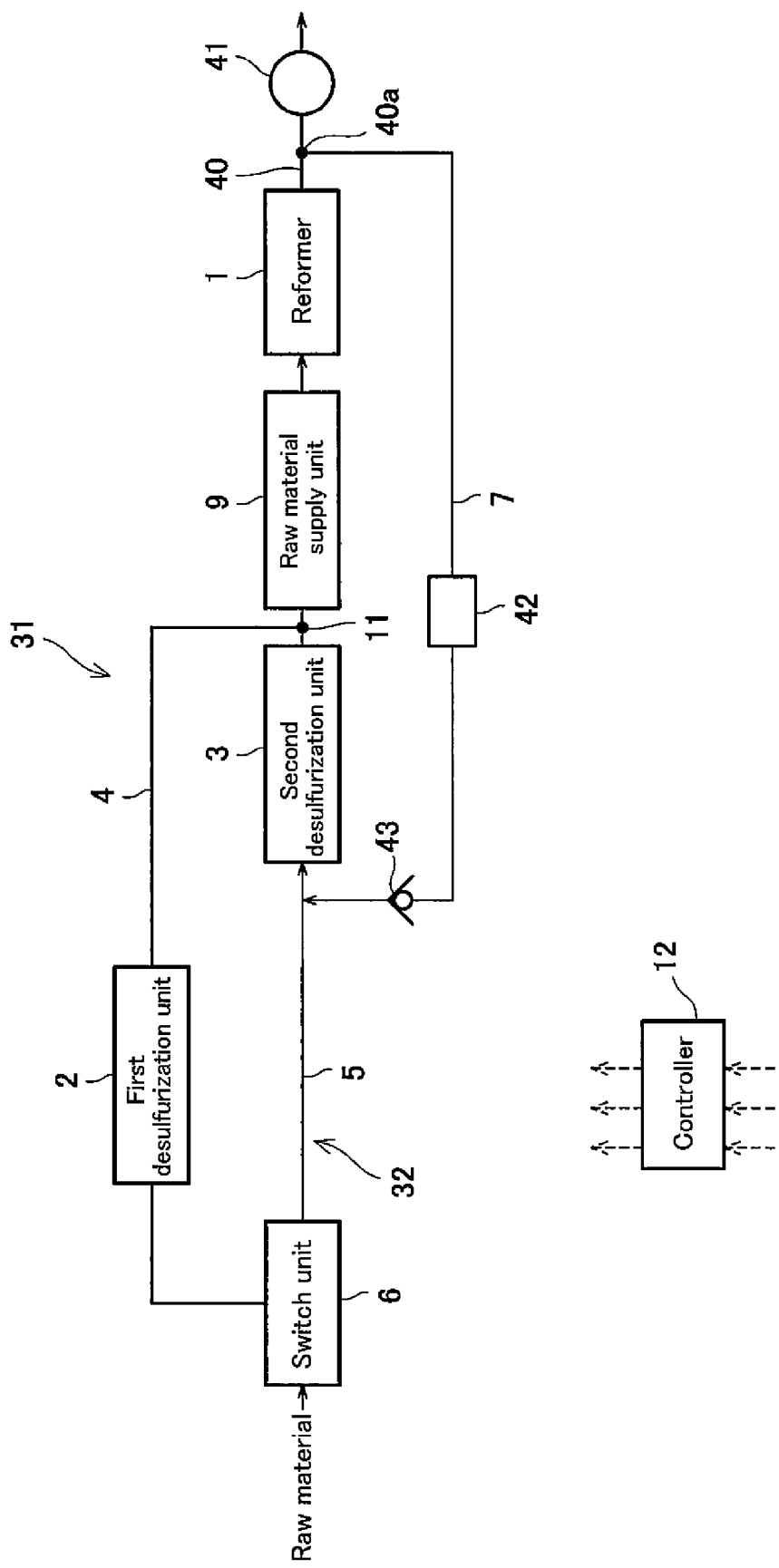
FIG. 7 is a block diagram showing a configuration in which the on-off valve 8 is replaced by another example of the flow control unit in the hydrogen generation device according to modified example 1 of Embodiment 1, as the hydrogen generation device according to Embodiment 4.

FIG. 6 is a block diagram showing a configuration in which the on-off valve 8 is replaced by another example of the flow control unit in the hydrogen generation device according to Embodiment 1, as a hydrogen generation device according to Embodiment 4. FIG. 7 is a block diagram showing a configuration in which the on-off valve 8 is replaced by another example of the flow control unit in the hydrogen generation device according to modified example 1 of Embodiment 1, as the hydrogen generation device according to Embodiment 4.

In this another example of the flow control unit, the recycle passage 7 is provided with a specified pressure loss mechanism (passage resistance) 42. This pressure loss mechanism 42 is formed, for example, by providing an orifice having a specified pressure loss (flow rate), or designing a pipe diameter of the recycle passage 7 so that it has a specified diameter. A hydrogen-containing gas supply passage 40 is provided at an exit of the reformer 1. A pressure loss adjusting unit 41 is provided in a portion of the hydrogen-containing gas supply passage 40, which is located downstream of a branch point 40a of the recycle passage 7. The pressure loss adjusting unit 41 is constituted by, for example, a variable orifice which is able to adjust the pressure loss (flow rate). The pressure loss in the pressure loss adjusting unit 41 is adjusted by the controller 12. The recycle passage 7 is provided with a check valve 43. This check valve may be omitted.

In the case where the hydrogen-containing gas is enabled to flow from the upstream end of the recycle passage 7 toward the downstream end of the recycle passage 7, the controller 12 makes the pressure loss in the pressure loss adjusting unit 41 greater than the pressure loss mechanism 42 of the recycle passage 7. This enables the hydrogen-containing gas to flow from the upstream end of the recycle passage 7 toward the downstream end of the recycle passage 7. On the other hand, in the case where the hydrogen-containing gas is inhibited from flowing from the upstream end of the recycle passage 7 toward the downstream end of the recycle passage 7, the controller 12 sets the pressure loss in the pressure loss adjusting unit 41 to substantially zero. This substantially inhibits the hydrogen-containing gas from flowing from the downstream end of the recycle passage 7 toward the upstream end of the recycle passage 7. The check valve 43 prevents the raw material gas from flowing back into the hydrogen-containing gas supply passage 40 through the recycle passage 7 in a state in which the raw material supply unit 9 is deactivated.

The above configuration can achieve advantages as those of Embodiment 1 and modified example 1.

Embodiment 4 may be applied to any one of modified examples 2 to 5, Embodiment 2 and Embodiment 3.

Embodiment 5

In Embodiment 5, another example of the flow control unit will be described.

Figure 8:
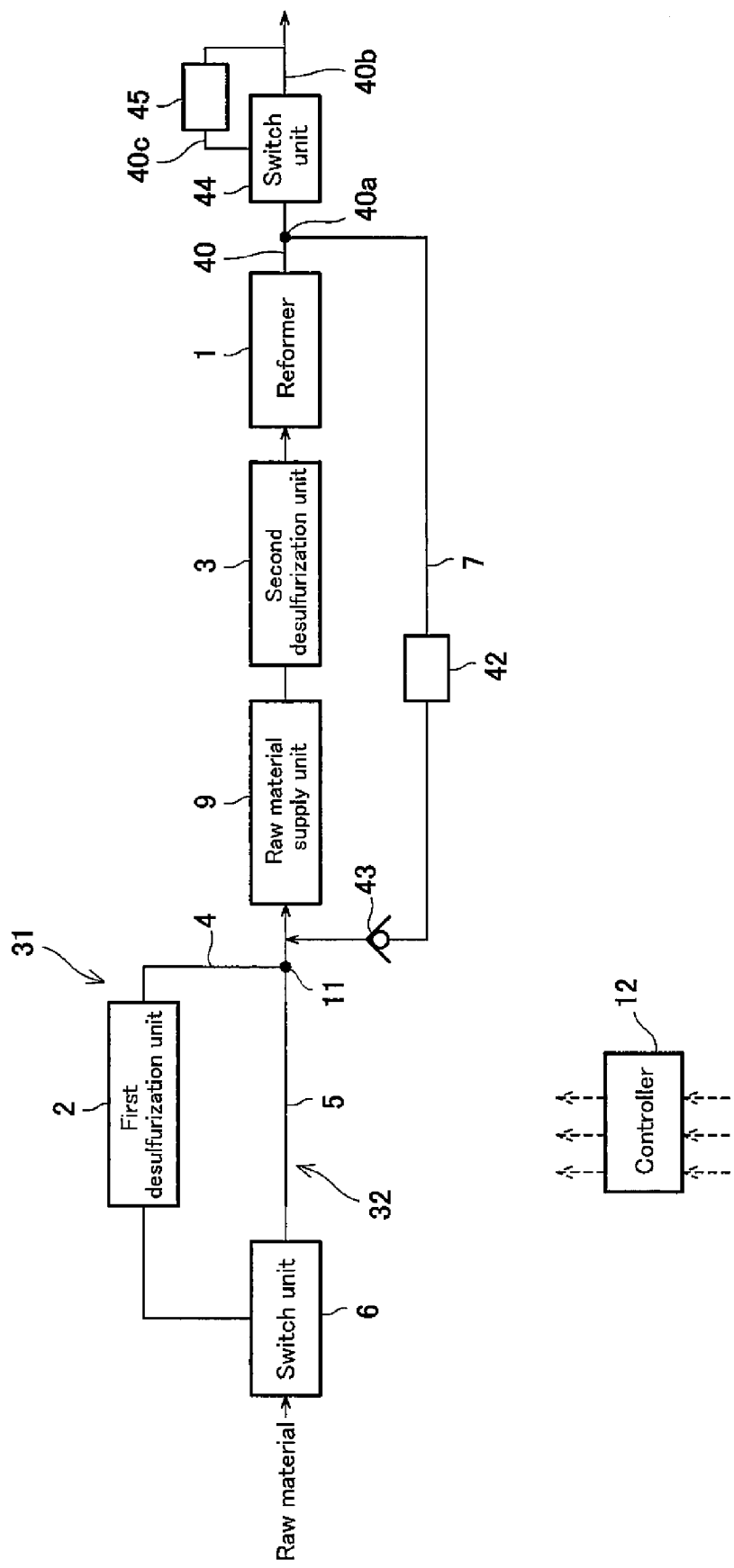
FIG. 8 is a block diagram showing a configuration in which the on-off valve 8 is replaced by another example of the flow control unit in the hydrogen generation device according to Embodiment 1, as a hydrogen generation device according to Embodiment 5.
Figure 9:
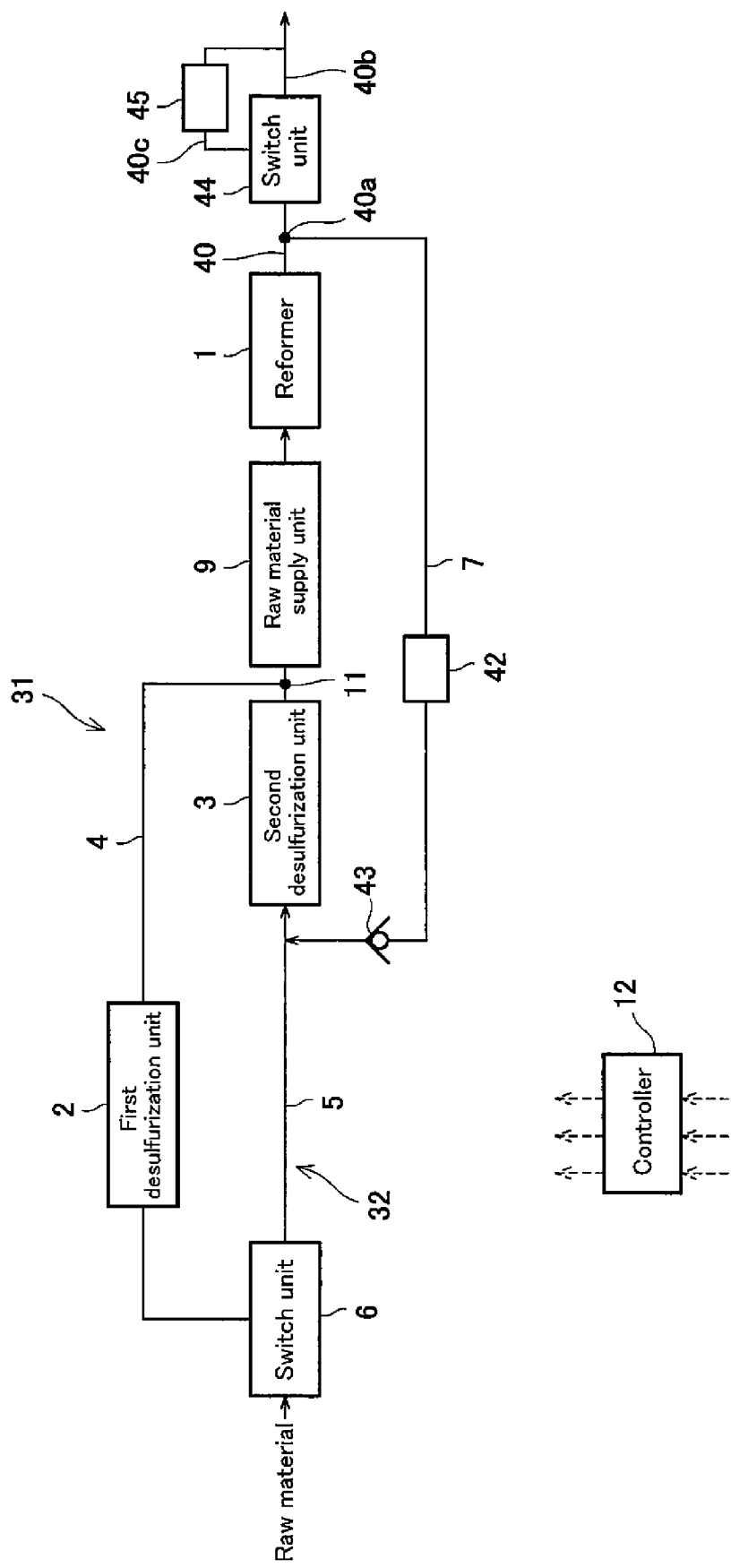
FIG. 9 is a block diagram showing a configuration in which the on-off valve 8 is replaced by another example of the flow control unit in the hydrogen generation device according to modified example 1 of Embodiment 1, as the hydrogen generation device according to Embodiment 5.

FIG. 8 is a block diagram showing a configuration in which the on-off valve 8 is replaced by another example of the flow control unit in the hydrogen generation device according to Embodiment 1, as a hydrogen generation device according to Embodiment 5. FIG. 9 is a block diagram showing a configuration in which the on-off valve 8 is replaced by another example of the flow control unit in the hydrogen generation device according to modified example 1 of Embodiment 1, as the hydrogen generation device according to Embodiment 4. Hereinafter, the same configuration as that of Embodiment 3 will not be described, but differences from Embodiment 3 will be described.

In this another example of the flow control unit, like Embodiment 3, the recycle passage 7 is provided with a specified pressure loss mechanism (passage resistance) 42. A switch unit 44 is provided in a portion of the hydrogen-containing gas supply passage 40, which is located downstream of the branch point 40a of the recycle passage 7. The switch unit 44 performs switching to connect an upstream portion of the hydrogen-containing gas supply passage 40 which is located upstream of the switch unit 44, to a shortcut passage 40b or a bypass passage 40c. The shortcut passage 40b and the bypass passage 40c are joined together in a downstream portion of the hydrogen-containing gas supply passage 40 which is located downstream of the switch unit 44. The bypass passage 40b is provided with the pressure loss mechanism 45 greater than the pressure loss mechanism 42 in the recycle passage 7. This pressure loss mechanism 45 is formed, for example, by providing an orifice having a specified pressure loss (flow rate), or designing a pipe diameter of the bypass passage 40b so that it has a specified diameter. The switch unit 44 is constituted by, for example, a three-way valve or on-off valves provided in the shortcut passage 40b and the bypass passage 40c, respectively, etc. The switching operation of the switch unit 44 is controlled by the controller 12.

In the case where the hydrogen-containing gas is enabled to flow from the upstream end of the recycle passage 7 toward the downstream end of the recycle passage 7, the controller 12 causes the switch unit 44 to perform switching to select the bypass passage 40c. This enables the hydrogen-containing gas to flow from the upstream end of the recycle passage 7 toward the downstream end of the recycle passage 7. On the other hand, in the case where the hydrogen-containing gas is inhibited from flowing from the upstream end of the recycle passage 7 toward the downstream end of the recycle passage 7, the controller 12 causes the switch unit 44 to perform switching to select the shortcut passage 40b. This substantially inhibits the hydrogen-containing gas from flowing from the upstream end of the recycle passage 7 toward the downstream end of the recycle passage 7.

The above configuration can achieve advantages as those of Embodiment 1 and modified example 1 of Embodiment 1.

Embodiment 5 may be applied to any one of modified examples 2 to 5, Embodiment 2 and Embodiment 3.

Embodiment 6

In a hydrogen generation device of Embodiment 6, the controller 12 executes the above processing in such a manner that the flow control unit enables the flow of the hydrogen-containing gas, when a temperature of the third path reaches a temperature at which water condensation in the third path does not occur, in the hydrogen generation device of any one of Embodiment 1, modified examples 1 to 5, Embodiment 2 and Embodiment 3.

With this configuration, passage clogging which would be caused by the water condensation in the third path is less likely to occur. This makes it possible to reduce a possibility that some problem will arise in processing in which the switch unit performs switching to select the first path and the flow control unit enables the flow of the hydrogen-containing gas, while the reformer is generating the hydrogen-containing gas.

The hydrogen generation device of the present embodiment may be configured like the hydrogen generation device of any one of Embodiment 1, modified examples 1 to 5, Embodiment 2 and Embodiment 3, except for the above features.

Hereinafter, an example of the hydrogen generation device of Embodiment 6 will be specifically described.

Figure 10:
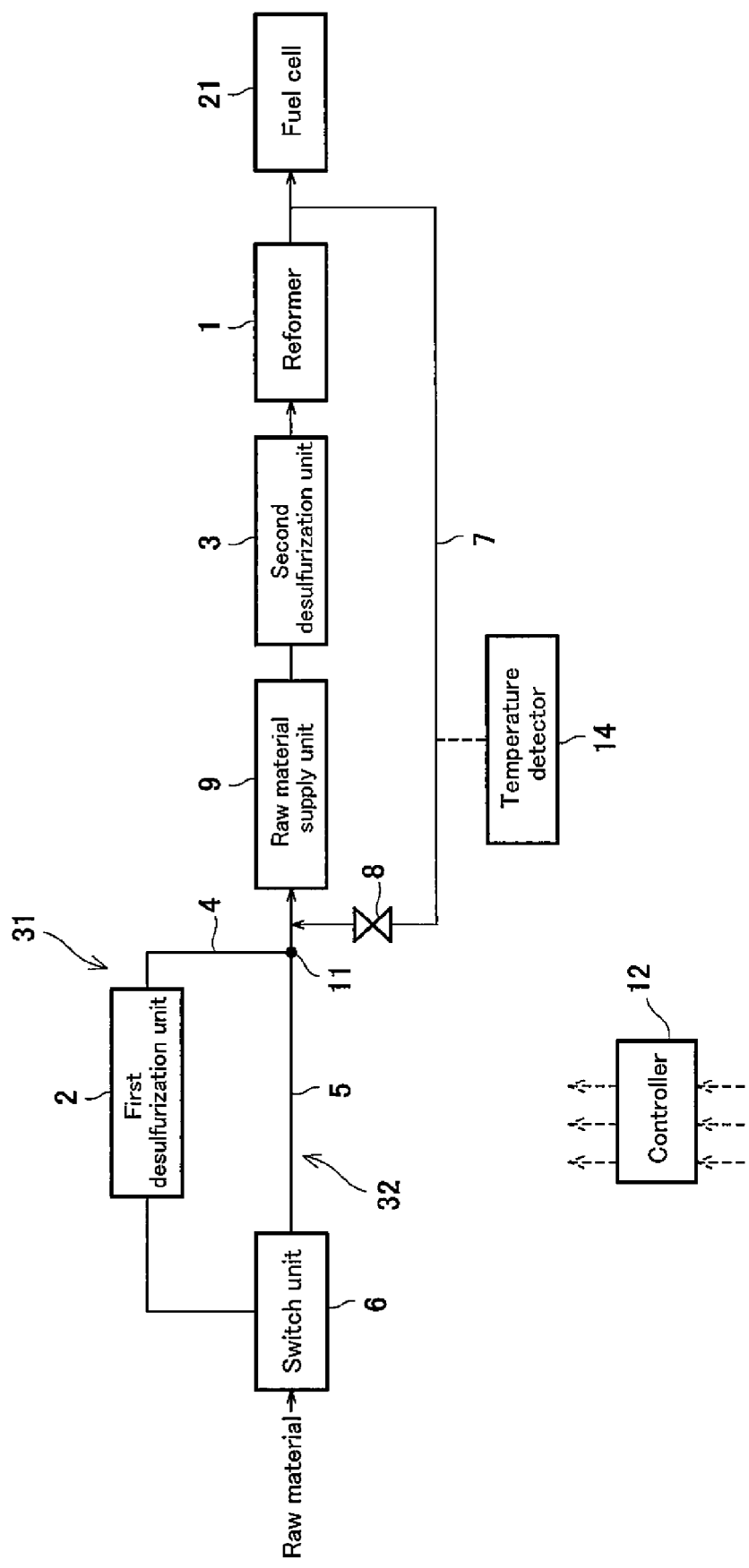
FIG. 10 is a block diagram showing an exemplary configuration of a hydrogen generation device according to Embodiment 6.

FIG. 10 is a block diagram showing an exemplary configuration of the hydrogen generation device according to Embodiment 6.

As shown in FIG. 10, the hydrogen generation device of the present embodiment includes a temperature detector 14 for detecting the temperature of the recycle passage 7. In FIG. 10, the other components which are designated by the same reference symbols as those in FIG. 1 are identical to those of Embodiment 1, and will not be described in detail.

The hydrogen generation device of the present embodiment includes the temperature detector for detecting the temperature of the recycle passage 7. This detector may directly or indirectly detect the temperature of the recycle passage 7. The phrase "the detector directly detects" means that it detects the temperature of the recycle passage 7. The phrase "the detector indirectly detects" means that it detects a physical amount (parameter) having a correlation with the temperature of the recycle passage 7.

The example of the hydrogen generation device of FIG. 10 includes a temperature detector 14 for detecting the temperature of the recycle passage 7, to directly detect the temperature of the recycle passage 7. As examples of the temperature detector 14, there is a temperature sensor such as a thermocouple or a thermistor. In a case where the recycle passage 7 is configured to be heated by heat transmitted from a heat source, the detector for detecting the temperature of the recycle passage 7 may be a temperature detector for detecting the temperature of the heat source. Based on the temperature of the heat source detected by this temperature detector, the temperature of the second desulfurization unit 3 is indirectly detected. Or, the detector for detecting the temperature of the second desulfurization unit 3 may be a timer for detecting time that passes after the start-up of the hydrogen generation device. Based on the time measured by the timer, the temperature of the second desulfurization unit 3 is indirectly detected.

Next, an exemplary operation of the hydrogen generation device of Embodiment 6, will be described.

Figure 11:
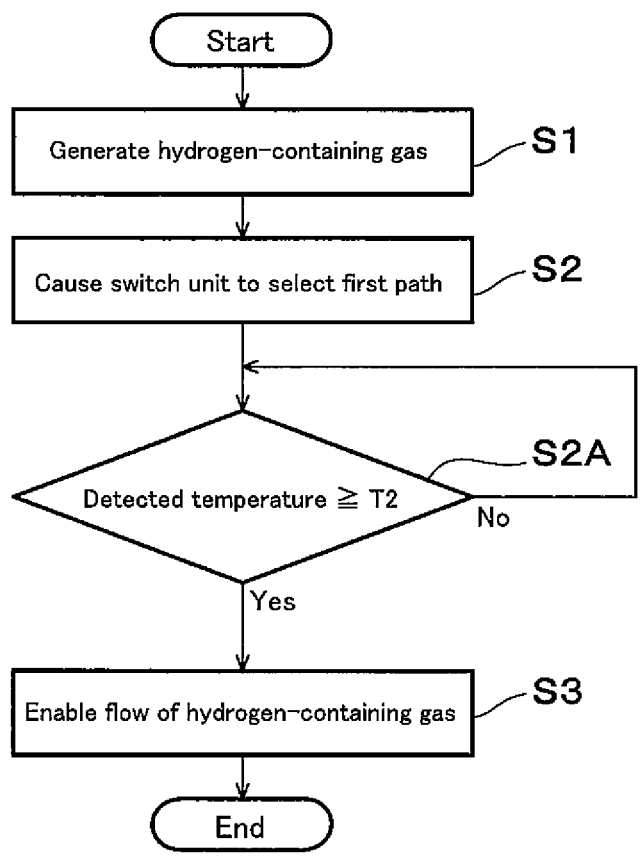
FIG. 11 is a block diagram showing an exemplary operation of the hydrogen generation device according to Embodiment 6.

FIG. 11 is a flowchart showing the exemplary operation of the hydrogen generation device of Embodiment 6. In at least either the time point before generation of the hydrogen-containing gas is stopped, or start-up, as shown in FIG. 11, the controller 12 executes processing in such a manner that while the reformer 1 is generating the hydrogen-containing gas (step S1), the switch unit 6 performs switching to select the first path 31 (step S2). Then, the controller 12 determines whether or not the temperature detected by the temperature detector 14 is equal to or higher than a temperature threshold T2. When the controller 12 determines that the detected temperature is equal to or higher than the temperature threshold T2 (step S2A), it controls the flow control unit to enable the hydrogen-containing gas to flow in the recycle passage 7 (step S3). At this time, the on-off valve 8 which is the flow control unit is opened to enable the flow of the hydrogen-containing gas.

So long as there is a period in which step S1 to step S3 are performed concurrently, step S1 to step S3 may be initiated in a desired order. That is, the three steps may be all initiated at the same time, or otherwise, one, two or all of these steps may be initiated at different timings. In the latter case, step S1 to step S3 may be initiated in any order.

Embodiment 7

Embodiment 7 includes the hydrogen generation device of any one of Embodiment 1, modified examples 1 to 5, and Embodiments 2 to 6, and a fuel cell for generating electric power using the hydrogen-containing gas supplied from the hydrogen generation device.

With this configuration, it becomes possible to reduce a possibility that a problem occurs due to fact that the sulfur compound which is not converted into hydrogen sulfide is adsorbed onto a hydrodesulfurization catalyst, as compared to a conventional example.

Figure 12:
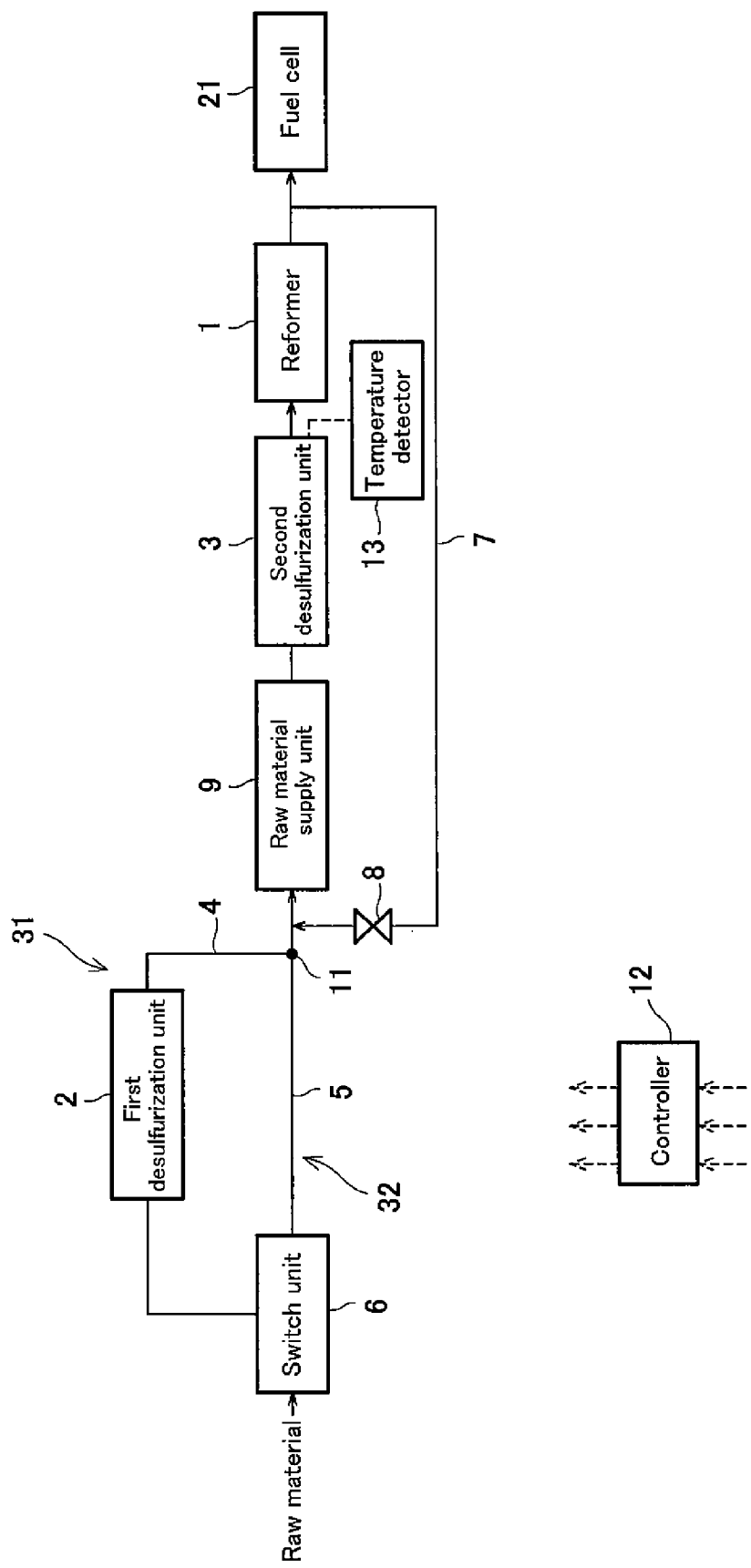
FIG. 12 is a block diagram showing an exemplary configuration of a fuel cell system according to Embodiment 7.

FIG. 12 is a block diagram showing an exemplary configuration of the hydrogen generation device according to Embodiment 7. As shown FIG. 12, the fuel cell system of Embodiment 7 includes the hydrogen generation device of Embodiment 1 and a fuel cell 21.

The fuel cell 21 generates electric power using the hydrogen-containing gas supplied from the hydrogen generation device. The fuel cell 21 is not particularly limited. As examples of the fuel cell 21, there are a polymer electrolyte fuel cell, a solid oxide fuel cell, a phosphorous acid fuel cell, a molten carbonate fuel cell, etc.

Numeral modifications and alternative embodiments of the present invention will be apparent to those skilled in the art in view of the foregoing description. Accordingly, the description is to be construed as illustrative only,

INDUSTRIAL APPLICABILITY

A hydrogen generation device, an operation method thereof, and a fuel cell system of the present invention are useful as a hydrogen generation device, an operation method thereof, a fuel cell system, etc., which can reduce a possibility that a problem occurs due to the fact that a sulfur compound which is not converted into hydrogen sulfide is adsorbed onto a hydrodesulfurization catalyst, as compared to a conventional example.

REFERENCE SIGNS LIST 1 reformer
2 first desulfurization unit
3 second desulfurization unit
4 branch passage
5 raw material passage
6 switch unit
7 recycle passage
8 on-off valve
9 raw material supply unit
11 joint
12 controller
13 temperature detector
21 fuel cell
22 heat exchanger
23 hot water storage tank
24a first exhaust heat recovery path
24b second exhaust heat recovery path
25 accumulated heat amount detector
31 first path
32 second path
40 hydrogen-containing gas supply passage
40a branch point
40b shortcut passage
40c bypass passage
41 pressure loss adjusting unit
42 pressure loss mechanism
43 check valve
44 switch unit
45 pressure loss mechanism

The invention claimed is:

1. A hydrogen generation device comprising:
    a reformer for generating a hydrogen-containing gas using a raw material;
    a first desulfurizer for adsorbing and desulfurizing a sulfur compound from the raw material supplied to the reformer;
    a second desulfurizer for hydrodesulfurizing the sulfur compound from the raw material supplied to the reformer;
    a first path used to supply the raw material to the reformer through at least the first desulfurizer;
    a second path used to supply the raw material to the reformer through only the second desulfurizer of the first desulfurizer and the second desulfurizer;
    a switch for performing switching between the first path and the second path;
    a third path used to supply the hydrogen-containing gas generated in the reformer to the second desulfurizer;
    a flow controller which selectively allows or inhibits a flow of the hydrogen-containing gas from an upstream end of the third path toward a downstream end of the third path; and
    a controller configured to, at least either before generation of the hydrogen-containing gas is stopped or when the hydrogen generation device is started, execute the following controls (i) and (ii) concurrently, while the reformer is generating the hydrogen-containing gas,
    (i) causing the switch to select the first path, and
    (ii) controlling the flow controller to allow the flow of the hydrogen-containing gas from the reformer to the second desulfurizer,
    wherein the controller executes the controls (i) and (ii) concurrently in a state in which a temperature of a hydrodesulfurization catalyst is a temperature at which hydrodesulfurization is enabled to proceed.

2. The hydrogen generation device according to claim 1, wherein the controller controls the flow controller to initiate the flow of the hydrogen-containing gas when a temperature of a hydrodesulfurization catalyst provided in the second desulfurizer is lower than a use temperature of the hydrodesulfurization catalyst.

3. The hydrogen generation device according to claim 1, wherein the controller controls the flow controller to initiate the flow of the hydrogen-containing gas when a temperature of the third path reaches a value which is equal to or higher than a temperature at which water condensation in the third path does not occur.

4. The hydrogen generation device according to claim 1, wherein the controller further causes the switch to perform switching to select the second path when a temperature of a hydrodesulfurization catalyst provided in the second desulfurizer is a use temperature of the hydrodesulfurization catalyst.

5. The hydrogen generation device according to claim 1, wherein the controller causes the switch to perform switching to select the first path and controls the flow controller to allow the flow of the hydrogen-containing gas for a predetermined time or longer.

6. The hydrogen generation device according to claim 5, wherein the predetermined time is set according to an accumulated supply amount of the raw material supplied to the second desulfurizer.

7. The hydrogen generation device according to claim 1, wherein the second desulfurizer includes a CoMo-based catalyst.

8. The hydrogen generation device according to claim 1, wherein the second desulfurizer includes a hydrodesulfurization catalyst which desorbs an unhydrogenated sulfur compound when the raw material is supplied to the second desulfurizer under a temperature lower than a use temperature; and
    wherein the controller controls the flow controller to initiate the flow of the hydrogen-containing gas, under a temperature which is equal to or lower than an upper limit temperature at which the unhydrogenated sulfur compound is not desorbed from the hydrodesulfurization catalyst.

9. The hydrogen generation device according to claim 8, wherein the hydrodesulfurization catalyst includes a CoMo-based catalyst, and the upper limit temperature is 150 degrees C.

10. The hydrogen generation device according to claim 1, wherein the second desulfurizer includes a CuZn-based catalyst.

11. A fuel cell system comprising:
    the hydrogen generation device as recited in claim 1; and
    a fuel cell for generating electric power using the hydrogen-containing gas supplied from the hydrogen generation device.

12. A method of operating a hydrogen generation device, the method comprising:
    (i) supplying a raw material, which has passed through a first desulfurizer for removing a sulfur compound from the raw material, to the reformer; and
    (ii) supplying a hydrogen-containing gas generated in the reformer to a second desulfurizer for hydrodesulfurizing the sulfur compound in the raw material,
    wherein the steps (i) and (ii) are concurrently executed at least either before generation of the hydrogen-containing gas is stopped or when the hydrogen generation device is started, and
    wherein the steps (i) and (ii) are concurrently executed in a state in which a temperature of a hydrodesulfurization catalyst is a temperature at which hydrodesulfurization is enabled to proceed.

13. The hydrogen generation device according to claim 1, wherein
    the controller includes processing circuitry and a memory storing a program, and
    the program makes the processing circuitry execute controls (i) and (ii).

14. A hydrogen generation device comprising:
    a reformer that generates a hydrogen-containing gas from a raw material;
    a first passage through which the raw material is supplied toward the reformer;
    a second passage through which the raw material is supplied toward the reformer;
    a switch disposed upstream of the first passage and the second passage to select the first passage or the second passage as a path through which the raw material flows;
    a first desulfurizer disposed on the first passage to absorb and desulfurize a sulfur compound from the raw material;
    a second desulfurizer that hydrodesulfurizes the sulfur compound from the raw material, the second desulfurizer disposed on a common passage or the second passage, the common passage extending from a joint, at which the first passage and the second passage are joined with each other, to the reformer;

a third passage through which the hydrogen-containing gas is supplied from downstream of the reformer to upstream of the second desulfurizer;

a flow controller disposed on the third passage to control a flow of the hydrogen-containing gas through the third passage; and a controller including processing circuitry and a memory storing a program, wherein, at least either before generation of the hydrogen-containing gas is stopped or when the hydrogen generation device is started, the program makes the processing circuitry execute the following controls (i) and (ii) concurrently, while the reformer is generating the hydrogen-containing gas, (i) causing the switch to select the first passage, and (ii) controlling the flow controller to allow the hydrogen-containing gas to flow from the reformer to the second desulfurizer, and wherein the controls (i) and (ii) are concurrently executed in a state in which a temperature of a hydrodesulfurization catalyst is a temperature at which hydrodesulfurization is enabled to proceed.

15. The hydrogen generation device according to claim 1, further comprising a raw material supplier for adjusting a flow rate of the raw material supplied to the reformer.

* * * * *